United States Patent
Jin et al.

(10) Patent No.: US 7,428,514 B2
(45) Date of Patent: Sep. 23, 2008

(54) SYSTEM AND METHOD FOR ESTIMATION OF A DISTRIBUTION ALGORITHM

(75) Inventors: Yaochu Jin, Rodgau (DE); Bernhard Sendhoff, Bruchköbel (DE); Tatsuya Okabe, Asaki (JP); Markus Olhofer, Seligenstadt (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 361 days.

(21) Appl. No.: 11/033,767

(22) Filed: Jan. 11, 2005

(65) Prior Publication Data

US 2005/0256684 A1    Nov. 17, 2005

(30) Foreign Application Priority Data

Jan. 12, 2004 (EP) .................................. 04000458
Apr. 29, 2004 (EP) .................................. 04010193

(51) Int. Cl.
G06N 5/00 (2006.01)
(52) U.S. Cl. .......................................... 706/13; 706/45
(58) Field of Classification Search ................. 706/13, 706/45, 47; 707/101; 702/19; 716/9; 703/2
See application file for complete search history.

(56) References Cited

U.S. PATENT DOCUMENTS

| | | |
|---|---|---|
| 5,074,752 A | 12/1991 | Murphy et al. |
| 5,136,686 A | 8/1992 | Koza |
| 5,148,513 A | 9/1992 | Koza et al. |
| 5,265,830 A | 11/1993 | Allen |
| 5,319,781 A | 6/1994 | Syswerda |
| 5,355,528 A | 10/1994 | Roska et al. |
| 5,461,570 A | 10/1995 | Wang et al. |

(Continued)

FOREIGN PATENT DOCUMENTS

EP    1205877 A1    5/2002

(Continued)

OTHER PUBLICATIONS

Angeline, Peter J., "Adaptive And Self-Adaptive Evolutionary Computations," Computational Intelligence: A Dynamic Systems Perspective, Palaniswami et al. (EDS), 1995, pp. 152-163.

(Continued)

*Primary Examiner*—Wilbert L Starks, Jr.
(74) *Attorney, Agent, or Firm*—Fenwick & West LLP

(57) ABSTRACT

The underlying invention generally relates to the field of Estimation of Distribution Algorithm, especially to optimization problems, including single-objective optimization and Multi-Objective Optimization.

The proposed method for optimization comprises six steps. In a first step it provides an initial population or a data set with a plurality of members respectively represented by parameter sets. Then one or a plurality of fitness functions are applied to evaluate the quality of the members of the population. In a third step offspring of the population is generated by means of a stochastic model using information from all members of the population. One or a plurality of fitness functions are applied to evaluate the quality of the offspring with respect to the underlying problem of the optimization. In a fifth step offspring is selected. Lastly the method goes back to the third step until the quality reaches a threshold value.

9 Claims, 18 Drawing Sheets

U.S. PATENT DOCUMENTS

| | | | |
|---|---|---|---|
| 5,487,130 A | 1/1996 | Ichimori et al. | |
| 5,541,848 A | 7/1996 | McCormack et al. | |
| 5,724,258 A | 3/1998 | Roffman | |
| 5,819,244 A | 10/1998 | Smith | |
| 5,924,048 A | 7/1999 | McCormack et al. | |
| 6,086,617 A * | 7/2000 | Waldon et al. | 703/2 |
| 6,285,968 B1 | 9/2001 | Motoyama et al. | |
| 6,292,763 B1 | 9/2001 | Dunbar et al. | |
| 6,430,993 B1 | 8/2002 | Seta | |
| 6,449,603 B1 | 9/2002 | Hunter | |
| 6,516,309 B1 | 2/2003 | Eberhart et al. | |
| 6,549,233 B1 | 4/2003 | Martin | |
| 6,578,018 B1 | 6/2003 | Ulyanov | |
| 6,606,612 B1 | 8/2003 | Rai et al. | |
| 6,654,710 B1 | 11/2003 | Keller | |
| 6,662,167 B1 | 12/2003 | Xiao | |
| 6,748,574 B2 * | 6/2004 | Sasagawa et al. | 716/9 |
| 6,781,682 B1 | 8/2004 | Kasai et al. | |
| 6,879,388 B2 | 4/2005 | Kasai et al. | |
| 6,917,882 B2 * | 7/2005 | Selifonov et al. | 702/19 |
| 6,928,434 B1 | 8/2005 | Choi et al. | |
| 6,950,712 B2 | 9/2005 | Ulyanov et al. | |
| 7,043,462 B2 | 5/2006 | Jin et al. | |
| 7,047,169 B2 | 5/2006 | Pelikan et al. | |
| 7,277,893 B2 * | 10/2007 | Aggarwal | 707/101 |
| 2002/0138457 A1 | 9/2002 | Jin et al. | |
| 2002/0165703 A1 | 11/2002 | Olhofer et al. | |
| 2003/0030637 A1 | 2/2003 | Grinstein et al. | |
| 2003/0055614 A1 | 3/2003 | Pelikan et al. | |
| 2003/0065632 A1 | 4/2003 | Hubey | |
| 2003/0191728 A1 | 10/2003 | Kulkarni et al. | |
| 2004/0014041 A1 | 1/2004 | Allan | |
| 2004/0030666 A1 | 2/2004 | Ulyanov et al. | |
| 2004/0034610 A1 | 2/2004 | Marra et al. | |
| 2004/0049472 A1 | 3/2004 | Hayashi et al. | |
| 2005/0209982 A1 | 9/2005 | Jin et al. | |
| 2005/0246297 A1 | 11/2005 | Chen et al. | |

FOREIGN PATENT DOCUMENTS

| | | |
|---|---|---|
| WO | WO 02/45012 A3 | 6/2002 |
| WO | WO 02/057946 A1 | 7/2002 |

OTHER PUBLICATIONS

Back, T et al., "Evolutionary Computation: Comments on the History and Current State," IEEE Transactions on Evolutionary Computation, Apr. 1997, pp. 3-17, vol. 1, No. 1.

Back, T. et al., "A Survey of Evolution Strategies," Proc. of the 4th Int'l Conf. on Genetic Algorithms, Jul. 1991, pp. 2-9.

Carson, Y. et al., "Simulation Optimization: Methods and Applications," Proc. of the 29th Winter Simulation Conf., 1997, pp. 118-126.

Eiben, A. et al., "Parameter Control In Evolutionary Algorithms," IEEE Transactions On Evolutionary Computation, vol. 3, No. 2, 1999, pp. 124-141.

European Search Report, EP Application No. 01104723, Aug. 22, 2001, 3 pages.

European Search Report, EP Application 04010194, Jun. 7, 2006, 3 pages.

Fagarasan, F., "A Genetic Algorithm With Variable Length Genotypes. Application In Fuzzy Modeling," Proceedings Of the Fourth European Congress on Intelligent Techniques, EUFIT '96, vol. 1, Sep. 2-5, 1996, pp. 405-409.

Koumoutsakos, P. et al., "Evolution Strategies for Parameter Optimization in Jet Flow Control," Center of Turbulence Research Annual Research Briefs, 1998.

Muller, S. et al., "Application of Machine Learning Algorithms to Flow Modeling and Optimization," Center of Turbulence Research Annual Research Briefs, 1999.

Pittman, J. et al., "Fitting Optimal Piecewise Linear Functions Using Genetic Algorithms," IEEE Transactions on Pattern Analysis and Machine Intelligence, Jul. 2000, pp. 701-718, vol. 22, Issue 7.

Sbalzarini, I. et al., "Evolutionary Optimization for Flow Experiments," Center of Turbulence Research Annual Research Briefs, 2000.

Srikanth, R. et al., "A Variable-Length Genetic Algorithm For Clustering And Classification," Pattern Recognition Letters, North-Holland Publ. Amsterdam, NL, vol. 16, No. 8, Aug. 1, 1995, pp. 789-800.

Weinert, K. et al., "Discrete NURBS-Surface Approximation Using An Evolutionaary Strategy," REIHE CI 87/00, SFB 531, 2000, pp. 1-7.

Agrez, D. "Active Power Estimation By Averaging of the DFT Coefficients," Proceedings of the 17th IEEE Instrumentation and Measurement Technology Conference, May 1-4, 2000, pp. 630-635, vol. 2.

Chen Y. et al., "Feature Subimage Extraction for Cephalogram Landmarking", Proc. of the 20th Annual International Conference of the IEEE Engineering in Medicine and Biology Society, Oct. 29, 1998, pp. 1414-1417.

Costa, M. et al., MOPED: A Multi-Objective Parzen-Based Estimation of Distribution Algorithm for Continuous Problems, Polytechnic of Turin, 13 pages, Turin, Italy.

Crump, K.S., "Numerical Inversion of Laplace Transforms Using a Fourier Series Approximation," Journal of the ACM (JACM), Jan. 1976, vol. 23, No. 1.

Dasgupta, D. et al.., Evolutionary Algorithms In Engineering Applications, Mar. 23, 1997, Springer-Verlag.

Dash, P.K. et al., "Genetic Optimization of a Self Organizing Fuzzy-Neural Network for Load Forecasting," IEEE Power Engineering Society Winter Meeting, Jan. 23-27, 2000. pp. 1011-1016, vol. 2.

Deb, K., Evolutionary Algorithms for Multi-Criterion Optimization in Engineering Design, In Miettinen et al., Evolutionary Algorithms in Engineering and Computer Science, 1999, pp. 135-161, John Wiley and Sons, Ltd., Chichester, UK.

Eshelman, L, et al., "Crossover Operator Biases: Exploiting the Population Distribution," Proceedings of the Seventh International Conference on Genetic Algorithms, 1997, pp. 354-361.

Eshelman, L. et al., "Real-Coded Genetic Algorithms and Interval-Schemata," Philips Laboratories, pp. 187-202, New York, New York, US.

European Search Report, EP Application No. 00124824, Jun. 14, 2001, 3 pages.

European Search Report, EP Application No. 0124825, May 14, 2001, 3 pages.

Fukuda, K., Aug. 26, 2004, What is Voronoi Diagram in $R_d$?, [online] [Retrieved on Aug. 18, 2005] Retrieved from the Internet<URL:http://www.ifor.math.ethz.ch/~fukuda/polyfaq/node29.html>.

Graves, R.W. et al., "Acoustic Wavefield Propagation Using Paraxial Explorators," ACM, 1988, pp. 1157-1175.

Grierson, D.E. et al., "Optimal Sizing, Geometrical and Topological Design Using a Genetic Algorithm", Structural Optimization, 1993, pp. 151-159, vol. 6.

Guerin, S. ObjectGarden: Evolving Behavior of Agents via Natural Selection on Weights and Topologies of Neural Networks,: May 1999, pp. 1-15.

Gupta, N. et al., "Automated Test Data Generation Using an Iterative Relaxation Method," Proceedings of the 6th ACM SIGSOFT International Symposium on Foundations of Software Engineering, ACM SIGSOFT Software Engineering Notes, Nov. 1998, vol. 23, No. 6.

Harik, G. et al., "The Compact Genetic Algorithm," IEEE, 1998, pp. 523-528.

Ishibuchi, H. et al., "Local Search Procedures in A Multi-Objective Genetic Local Search Algorithm For Scheduling Problems," IEEE, 1999, pp. 665-670.

Jin, Y. et al., "On Generating FC3 Fuzzy Rule Systems From Data Using Evolution Strategies," IEEE Transactions on Systems, Man and Cybernetics Part B, Dec. 1999, pp. 829-845, vol. 29, No. 6.

Kita, H. et al., "Multi-Parental Extension of the Unimodal Normal Distribution Crossover for Real-Coded Genetic Algorithms," IEEE, 1999, pp. 1581-1588.

Knowles, J. et al., "The Pareto Archived Evolution Strategy: A New Baseline Algorithm For Pareto Multiobjective Optimisation," IEEE, 1999, pp. 98-105.

Kvasnicka, V. et al., "Hill Climbing with Learning (An Abstraction of Genetic Algorithm)", Slovak Technical University, 6 pages, Bratislava, Slovakia.

Li et al., "Text Enhancement in Digital Video Using Multiple Frame Integration," Proceedings of the Seventh ACM International Conference on Multimedia (Part 1), Oct. 1999, pp. 19-22.

Lohn, J.D. et al., "A Comparison Of Dynamic Fitness Schedules For Evolutionary Design Of Amplifiers," 6 pages.

Mitlöhner, "Classifier Systems and Economic Modeling," Proceedings of the Conference on Designing the Future, ACM SIGAPLAPL Quote Quad, Jun. 1996, vol. 26, No. 4.

Ono, I. et al., "A Real-Coded Genetic Algorithm for Function Optimization Using Unimodal Normal Distribution Crossover," Proceedings of the Seventh International Conference on Genetic Algorithms, pp. 246-253, 1997.

Ratle, A., "Accelerating the Convergence of Evolutionary Algorithms by Fitness Landscape Approximation", Parallel Problem Solving from Nature—PPSN V.5$^{th}$ International Conference Proceedings, Sep. 1998, pp. 87-96.

Ratle, A., "Optimal Sampling Strategies for Learning a Fitness Model", *Proc. of 1999 Congress on* Evolutionary Computation, Jul. 9, 1999, pp. 2078-2085, vol. 3.

Redmond, J., "Actuator Placement Based on Reachable Set Optimization for Expected Disturbance", Journal of Optimization Theory and Applications, Aug. 1996, pp. 279-300. vol. 90, No. 2.

Sendhoff, B., "Evolutionary Optimised Ontogenetic Neural Networks with Incremental Problem Complexity During Development," Proceedings of the 2000 Congress on Evolutionary Computation, Jul 16-19, 2000, pp. 1443-1450, vol. 2.

Takahashi, M. et al., "A Crossover Operator Using Independent Component Analysis for Real-Coded Geneti Algorithms," Tokyo Institute of Technology and National Institution for Academic Degrees, 7 pages, Japan.

Tuson, A. et al., "Adapting Operator Settings In Genetic Algorithms," Final Draft of The Paper Which Will Appear In *Evolutionary Computation*, Mar. 25, 1998, pp. 1-17.

Van Veldhuizen, D.A. et al., Multiobjective Evolutionary Algorithms: Analyzing the State-of-the-Art, Evolutionary Computation, 2000, 125-147, vol. 8, No. 2, The MIT Press, Cambridge, MA.

Yu, M. et al., "Genetic Algorithm Approach to Image Segmentation using Morphological Operations", Image Processing, ICIP 1998, IEEE, Oct. 1998, pp. 775-779, vol. 3.

Zhang, B., "A Bayesian Framework for Evolutionary Computation," IEEE, 1999, pp. 722-728.

Baluja, S. et al., "Combining Multiple Optimization Runs With Optimal Dependency Trees," Jun. 30, 1997, 12 pages, CMU-CS-97-157, Justsystem Pittsburgh Research Center, Pittsburgh, PA and School Of Computer Science, Carnegie Mellon University, Pittsburgh, PA.

Baluja, S., "Population-Based Incremental Learning: A Method For Integrating Genetic Search Based Function Optimization And Competitive Learning," Population Based Incremental Learning, Jun. 2, 1994, pp. 1-41, CMU-CS-94-163, School Of Computer Science, Carnegie Mellon University, Pittsburgh, PA.

Bosman, P. et al., "Advancing Continuous IDEAs With Mixture Distributions And Factorization Selection Metrics," 6 pages, Institute Of Information And Computing Sciences, Utrecht University, Utrecht, The Netherlands.

Bosman, P. et al., "An Alorithmic Framework For Density Estimation Based Evolutionary Algorithms," Dec. 1999, pp. 1-63, Department Of Computer Science, Utrecht University, Utrecht, The Netherlands.

Bosman, P. et al., "Continuous Iterated Density Estimation Evolutionary Algorithms Within The IDEA Framework," 10 pages, Department Of Computer Science, Utrecht University, Utrecht, The Netherlands.

Bosman, P. et al., "IDEAs Based On The Normal Kernels Probability Density Function," Mar. 2000, pp. 1-16, Department Of Computer Science, Utrecht University, Utrecht, The Netherlands.

Bosman, P. et al., "Mixed IDEAs," Dec. 2000, pp. 1-71, UU-CS-2000-45, Institute Of Information And Computing Sciences, Utrecht University, Utrecht, The Netherlands.

Bosman, P. et al., "Negative Log-Likelihood And Statistical Hypothesis Testing As The Basis Of Model Selection In IDEAs," Aug. 2000, pp. 1-17, Department Of Computer Science, Utrecht University, Utrecht, The Netherlands.

Branke, J. et al., "Faster Convergence By Means Of Fitness Estimation," Oct. 1, 2002, pp. 1-9, Institute AIFB, University of Karlsruhe, Karlsruhe, Germany.

Deb, K. et al., "A Computationally Efficient Evolutionary Algorithm For Real-Parameter Optimization," KanGAL Report No. 2002003, Apr. 11, 2002, pp. 1-21, Kanpur Genetic Algorithms Laboratory, (KanGAL), Indian Institute Of Technology Kanpur, Tsutsui Kanpur, India.

Deb, K. et al., "A Fast And Elitist Multi-Objective Genetic Algorithm: NSGA-II," KanGAL Report No. 200001, 20 pages, Kanpur Genetic Algorithms Laboratory (KanGAL), Indian Institute Of Technology Kanpur, Kanpur, India.

Deb, K., "A Population-Based Algorithm-Generator For Real-Parameter Optimization," KanGAL Report No. 2003003, 25 pages, Kanpur Genetic Algorithms Laboratory (KanGAL), Indian Institute Of Technology, Kanpur, Kanpur, India.

Deb, K. et al., "Self-Adaptation In Real-Parameter Genetic Algorithms With Simulated binary Crossover," GECCO '99/Genetic Algorithms, 8 pages, Kanpur Genetic Algorithms Laboratory (KanGAL), Department of Mechanical Engineering, Indian Institute Of Technology Kanpur, India and Department Of Computer Science/ XI, University of Dortmund, Dortmund, Germany.

Deb, K. et al., "Simulated Binary Crossover For Continuous Search Space," Nov. 1994, pp. 1-33, IITK/ME/SMD-94027, Convenor, Technical Reports, Department Of Mechanical Engineering, Indian Institute Of Technology, Kanpur, India.

De Bonet, J. et al., "MIMIC: Finding Optima By Estimating Probability Densities," Advances In Neural Information Processing Systems, 1997, 8 pages, MIT Press, Cambridge, MA.

El-Beltagy, M. A. et al., "Metamodeling Techniques For Evolutionary Optimization Of Computationally Expensive Problems: Promises And Limitations," Genetic Algorithms And Classifier Systems, pp. 196-203.

Emmerich, M. et al., "Metamodel—Assisted Evolution Strategies," PPSN VII, LNCS 2439, 2002, pp. 361-370, Springer Verlag, Berlin, Heidelberg.

"Genetic Algorithms For Optimization Taking Account Of Characteristics Preservation," pp. 1-110.

Harik, G., "Linkage Learning Via Probabilistic Modeling In The ECGA," IlliGAL Technical Report 99010, Jan. 1999, 19 pages, Illinois Genetic Algorithms Laboratory, Department of General Engineering, Urbana, IL.

Harik, G. et al., "The Compact Genetic Algorithm," IlliGAL Report No. 97006, Aug. 1997, pp. 1-21, Illinois Genetic Algorithms Laboratory, Department Of General Engineering, University Of Illinois At Urbana-Champaign, Urbana, IL.

Jain, A.K. et al., "Data Clustering: A Review," ACM Computing Surveys, Sep. 1999, pp. 264-323, vol. 31, No. 3, Michigan State University, Indian Institute Of Science and The Ohio State University.

Jimenez, D. et al., "Dynamically Weighted Ensemble Neural Networks For Classification," IEEE, 1998, pp. 753-756, The University Of Texas Health Science Center at San Antonio.

Jin, Y. et al., "Connectedness, Regularity And The Success Of Local Search In Evolutionary Multi-Objective Optimization," 8 pages, Honda Research Institute Europe, Offenbach/M, Germany.

Jin, Y. et al., "Fitness Approximation In Evolutionary Computation—A Survey," 8 pages, Future Technology Research, Honda R&D Europe (D) GmbH, Offenbach/Main, Germany.

Jin, Y. et al., "A Framework For Evolutionary Optimization With Approximate Fitness Functions," IEEE Transactions On Evolutionary Computation, Oct. 2002, pp. 481-494, vol. 6, No. 5.

Jin, Y. et al., "On Evolutionary Optimization With Approximate Fitness Functions," 8 pages, Future Technology Research, Honda R&D Europe (D) GmbH, Offenbach/Main, Germany.

Khan, N. et al., "Multi-Objective Bayesian Optimization Algorithm," IlliGAL Report No. 2002009, Mar. 2002, pp. 1-10, Illinois Genetic Algorithms Laboratory, University Of Illinois At Urbana-Champaign, Urbana, IL.

Kim, H.S. et al., "An Efficient Genetic Algorithm With Less Fitness Evaluation By Clustering," IEEE, 8 pages, MW Lab, Mindware, Co., Ltd., Seoul, Korea and Department of Computer Science, Yonsel University, Seoul, Korea.

Larranaga, P. et al., "Optimization By Learning And Simulation Of Bayesian And Gaussian Networks," Technical Report EHU-KZAA-IK-4/99, Dec. 31, 1999, pp. 1-70, Intelligent Systems Group, Dept. Of Computer Science And Artifical Intelligence, University Of The Basque Country.

Laumanns, M. et al., "Bayesian Optimization Algorithms For Multi-Objective Optimization," 10 pages, ETH Zurich, Computer Engineering And Networks Laboratory and VUT Bmo, Faculty Of Information Technology, Bmo.

Liu, Y. et al., "Negatively Correlated Neural Networks Can Produce Best Ensembles," Australian Journal Of Intelligent Information Processing Systems, Spring/Summer 1997, pp. 176-185, Computational Intelligence Group, School Of Computer Science, University College, Australian Defence Force, The University Of South Wales, Canberra, Australia.

Liu, Y. et al., "Evolutionary Ensembles With Negative Correlation Learning," pp. 1-27, The University Of Aizu, Fukushima Japan, The University Of Birmingham, Birmingham, U.K. and Evolvable Systems Laboratory, Computer Science Division, Ibaraki, Japan.

Liu, Y. et al., "Simultaneous Training Of Negatively Correlated Neural Networks In An Ensemble," IEEE Transactions On Systems, Man, And Cybernetics—Part B: Cybernetics, Dec. 1999, pp. 716-725, vol. 29, No. 6.

Lobo, F. et al., "Extended Compact Genetic Algorithm In C++," IlliGAL Report 99016, Jun. 1999, pp. 1-4, Illinois Genetic Algorithms Laboratory, Department Of General Engineering, University Of Illinois At Urbana-Champaign, Urbana, IL.

Muhlenbein, H., "The Equation For The Response To Selection And Its Use For Prediction," pp. 1-46, RWCP Theoretical Foundation GMD Laboratory, Sankt Augustin.

Muhlenbein, H. et al., "Evolutionary Algorithms: From Recombination To Search Distributions," pp. 1-39, RWCP Theoretical Foundation GMD Laboratory, Sankt Augustin.

Muhlenbein, H. et al., "Evolutionary Synthesis Of Bayesian Networks For Optimization," MIT Press Math6×9, Sep. 1999, pp. 1-27.

Muhlenbein, H. et al., "The Factorized Distribution Algorithm For Additively Decomposed Functions," Proceedings Of The 1999 Congress On Evolutionary Computation, 1999, IEEE Press, pp. 752-759, Real World Computing Partnership, Theoretical Foundation GMD Laboratory, Sankt Augustin, Germany.

Muhlenbein, H. et al., "FDA—A Scalable Evolutionary Algorithm For The Optimization Of Additively Decomposed Functions," Evolutionary Computation, 1999, pp. 45-68, vol. 7, No. 1, Theoretical Foundation GMD Lab, Real World Computing Partnership, GMD FZ Informationstechnik, St. Augustin.

Muhlenbein, H. et al., "From Recombination Of Genes To The Estimation Of Distributions I. Binary Parameters," 10 pages, GMD—Forschungszentrum Informationstechnik, Sankt Augustin, Germany.

Okabe, T. et al., "Evolutionary Multi-Objective Optimisation With A Hybrid Representation," 8 pages, Honda Research Institute Europe, Offenbach/M, Germany.

Ono, I. et al., "A Robust Real-Coded Genetic Algorithm Using Unimodal Normal.Distribution Crossover Augmented By Uniform Crossover: Effects For Self-Adaptation Of Crossover Probabilities," 8 pages, University of Tokushimsa, Tokushima, Japan, Tokyo Institute Of Technology, Yokohama, Japan and Tokyo Institute Of Technology, Yokohama, Japan.

Ono, I. et al., "A Real-Coded Genetic Algorithm For Function Optimization Using The Unimodal Normal Distribution Crossover," Technical Papers, 1999, pp. 1-11, University Of Tokushima, Tokushima, Japan, National Defence Academy, Yokosuka, Japan and Tokyo Institute Of Technology, Yokohama, Japan.

Optiz, D. et al., "Generating Accurate And Diverse Members Of A Neural-Network Ensemble," Advances in Neural Information Processing Systems 8, 7 pages, MIT Press, Cambridge, MA, Computer Science Department, University Of Minnesota, Duluth, MN and Computer Sciences Department, University Of Wisconsin, Madison, WI.

Paul, T. et al, "Reinforcement Learning Estimation Of Distribution Algorithm," 12 pages, Graduate School Of Frontier Sciences, The University Of Tokyo, Tokyo, Japan.

Pelikan, M. et al., "BOA: The Bayesian Optimization Algorithm," 8 pages, Illinois Genetic Algorithms Laboratory, Department Of General Engineering, University Of Illinois At Urbana-Champaign.

Pelikan, M. et al., "BOA: The Bayesian Optimization Algorithm," IlliGAL Report No. 99003, Jan. 1999, pp. 1-12, Illinois Genetic Algorithms Laboratory, University Of Illinois At Urbana-Champaign, Urbana, IL.

Pelikan, M. et al., "Linkage Problem, Distribution Estimation, And Bayesian Networks," IlliGAL Report No. 98013, Nov. 1998, pp. 1-24, Illinois Genetic Algorithms Laboratory, University Of Illinois At Urbana-Champaign, Urbana, IL.

Pelikan, M. et al., "Marginal Distributions In Evolutionary Algorithms," pp. 1-6, Slovak Technical University, Bratislava, Slovakia and GMD Forschungszentrum Informationstechnik, Sankt Augustin, Germany.

Pelikan, M. et al., "A Survey Of Optimization By Building And Using Probabilistic Models," IlliGAL Report No. 99018, Sep. 1999, pp. 1-11, Illinois Genetic Algorithms Laboratory, University Of Illinois At Urbana-Champaign, Urbana, IL.

Perrone, M. et al., "When Networks Disagree: Ensemble Methods For Hybrid Neural Networks," Oct. 27, 1992, 15 pages, Physics Department, Neuroscience Department, Institute For Brain And Neural Systems, Brown University, Providence, R.I., To Appear In "Neural Networks For Speech And Image Processing," R.J. Mammone, ed., Chapman-Hall, 1993.

Ratle, A., "Accelerating The Convergence Of Evolutionary Algorithms By Fitness Landscape Approximation," pp. 87-96, Departement De Genie Mecanique, Universite de Sherbrooke, Quebec, Canada.

Rosen, B., "Ensemble Learning Using Decorrelated Neural Networks," To Appear In Connections Science, pp. 1-14, Computer Science Division, University Of Texas At San Antonio, San Antonio, TX.

Rousseeuw, P., "Silhouettes: A Graphical Aid To The Interpretation And Validation Of Cluster Analysis," Journal Of Computational And Applied Mathematics, 1987, pp. 53-65, vol. 20, University Of Fribourg, Fribourg, Switzerland.

Rudlof, S. et al., "Stochastic Hill Climbing With Learning By Vectors Of Normal Distributions," Aug. 5, 1996, pp. 1-11, Fraunhofer-Institut For Production Systems And Design Technology (IPK), Berlin.

Sebag, M. et al., "Extending Population-Based Incremental Learning To Continuous Search Spaces," 10 pages, Ecole Polytechnique, Palaiseau Cedex and Universite d'Orsay, Orsay Cedex.

Thierens, D. et al., "Multi-Objective Mixture-Based Iterated Density Estimation Evolutionary Algorithms," 8 pages, Institute Of Information And Computing Sciences, Utrecht University, Utrecht, The Netherlands.

Tsutsui, S. et al., "Evolutionary Algorithm Using Marginal Histogram Models In Continuous Domain," IlliGAL Report No. 2001019, Mar. 2001, pp. 1-16, Illinois Genetic Algorithms Laboratory, University Of Illinois At Urbana-Champaign, Urbana, Illinois.

Tsutsui, S. et al., "Multi-Parent Recombination With Simplex Crossover In Real Coded Genetic Algorithms," 8 pages, Department Of Management And Information Science, Hannan University, Osaka, Japan and Graduate School Of Interdisciplinary Science And Engineering, Tokyo Institute Of Technology, Yokohama, Japan.

Tsutsui, S., "Sampling Bias And Search Space Boundary Extension In Real Coded Genetic Algorithms," 8 pages, Department Of Management And Information Science, Hannan University, Osaka, Japan.

Tsutsui, S. et al., "Search Space Boundary, Extension Method In Real-Coded Genetic Algorithms," Information Sciences, May 2001, pp. 229-247, vol. 133, No. 3-4, Department Of Management And Information Science, Hannan University, Osaka, Japan and Illinois Genetic Algorithms Laboratory, University Of Illinois At Urbana-Champaign, Urbana, IL.

Tsutsui, S. et al., "Simplex Crossover And Linkage Identifications: Single-Stage Evolution VS. Multi-Stage Evolution," IEEE, 2002, 6 pages, Department Of Management And Information, Hannan University, Osaka, Japan and Illinois Genetic Algorithms Laboratory, Department Of General Engineering, University Of Illinois At Urbana-Champaign, Urbana, IL.

Tsutsui, S. et al., "Simplex Crossover And Linkage Learning In Real-Coded GAs," Genetic Algorithms: Poster Paper, p. 785, Department Of Management And Information Science, Hannan University, Osaka, Japan and Illinois Genetic Algorithms Laboratory, University Of Illinois At Urbana-Champaign, Urbana, IL.

Tsutsui, S. et al., "Probabilistic Model-Building Genetic Algorithms Using Marginal Histograms In Continuous Domain," KES'01, N. Baba et al. (Eds.), IOS Press, 2001, pp. 112-121, Department Of Management And Information, Hannan University, Osaka, Japan and Illinois Genetic Algorithms Laboratory, Department Of General Engineering, University Of Illinois At Urbana-Champaign, Urbana, IL.

Ueda, T. et al., "Efficient Numerical Optimization Technique Based On Real-Coded Genetic Algorithm," Genome Informatics, 2001, pp. 451-453, vol. 12, Graduate School Of Bioresource And Bioenvironmental Sciences, Kyushu University, Fukuoka, Japan and Department Of Biochemical Engineering and Science, Kyushu Institute Of Technology, Fukuoka, Japan.

Ulmer, H. et al., "Model-Assisted Steady-State Evolution Strategies," 12 pages, Center For Bioinformatics Tübingen (ZBIT), University of Tübingen, Tübingen, Germany.

What Is Voronoi Diagram In $R^{d?}$, 2 pages.

Yao, X. et al., "Making Use Of Population Information in Evolutionary Artificial Neural Networks," IEEE Transactions On Systems, Man, And Cybernetics, Jun. 1998, pp. 417-425, vol. 28, No. 3.

Zhang, B. et al., "Building Optimal Committees Of Genetic Programs," pp. 1-10, Artificial Intelligence Lab (SCAI) School Of Computer Science And Engineering, Seoul National University, Korea.

Hruschka, E.R. et al., "Using a Clustering Genetic Algorithm for Rule Extraction from Artificial Neural Networks," IEEE, 2000, pp. 199-206.

Kim, H.S. et al., "An Efficient Genetic Algorithm with Less Fitness Evaluation by Clustering," IEEE, 2001, pp. 887-894.

Li, M. et al. "Hybrid Evolutionary Search Method Based on Clusters," IEEE Transaction on Pattern Analysis and Machine Intelligence, Aug. 2001, pp. 786-799, vol. 23, No. 8.

Liu, F. et al., "Designing Neural Networks Ensembles Based on the Evolutionary Programming," Proceedings of the Second International Conference on Machine Learning and Cybernetics, Xi'an, IEEE, Nov. 2-5, 2003, pp. 1463-1466.

Zhou, Z.H. et al., "Genetic Algorithm Based Selective Neural Networks Ensemble," Proceedings of the 17th International Joint Conference on Artificial Intelligence, IEEE, 2001, pp. 797-802, vol. 2.

Yao, X. et al., "Making Use of Population Information in Evolutionary Artificial Neural Networks," IEEE Transactions on Systems, Man, and Cybernetics—Part B: Cybernetics, Jun. 1998, pp. 417-425, vol. 28, No. 3.

Cho, D. et al., "Continuous Estimation of Distribution Algorithms with Probabilistic Principal Component Analysis," IEEE Proceedings of the 2001 Congress on Evolutionary Computation, May 2001, pp. 521-526, vol. 1, Piscataway, New Jersey, U.S.A.

European Search Report, EP 04010193.3, Oct. 19, 2006, 4 Pages.

Kim, H. et al., "An Efficient Genentic Algorithm With Less Fitness Evaluation by Clustering," 2001, IEEE, pp. 887-894.

Krishna, K. et al., "Pattern Classification Using Voronoi Networks," Proceedings of the Indian National Science Academy, Part A, Physical Sciences, Indian National Science Academy, Mar. 2001, pp. 277-294, vol. 67, No. 2, New Delhi, India.

Sambridge, M., "Geophysical Inversion With A Neighborhood Algorithm—I. Searching a Parameter Space," Geophysical Journal International Blackwell Science for R. Astron. Soc. Aug. 1999, pp. 479-494, vol. 138, No. 2.

Schoennauer, M. et a., "Non-parametric Identification of Geological Models," 1998 IEEE International Conference on Evolutionary Computation Proceedings, IEEE World Congress on Computational Intelligence, May 1998, pp. 136-141, New York, U.S.A.

Zhou, H. et al., "Genetic Algorithm Based Selective Neural Ensemble," Proceedings of the 17th International Joint Conference on Artificial Intelligence, 2001, pp. 797-802, vol. 2, Seattle, Washington, U.S.A.*

* cited by examiner

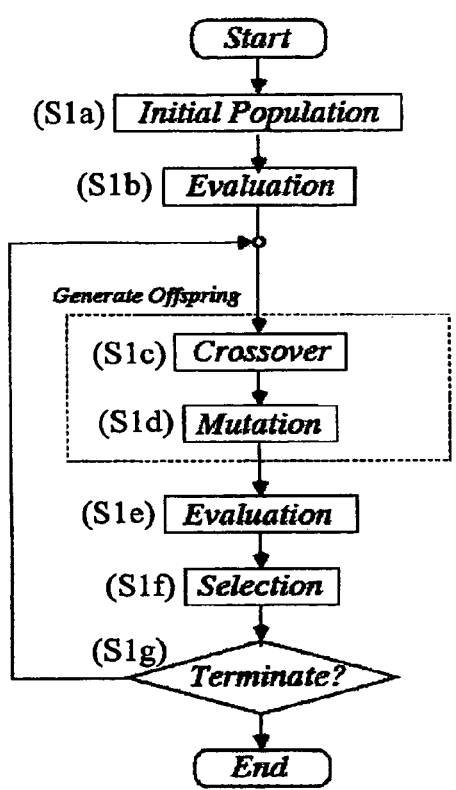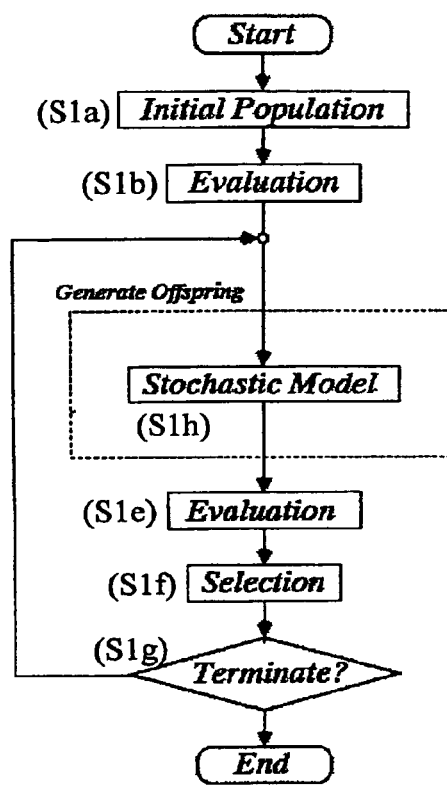
(a)          (b)
Fig. 1

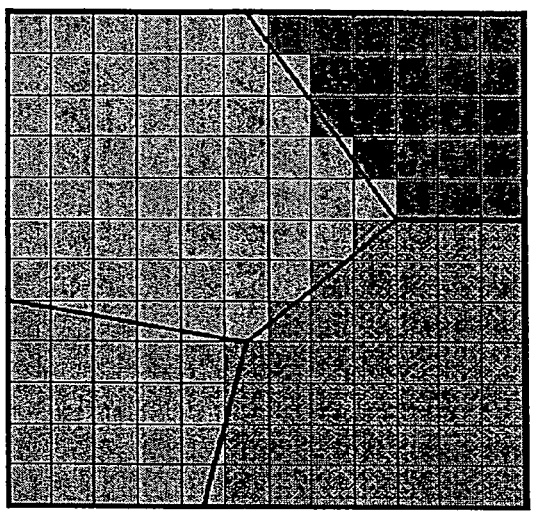  Voronoi mesh
 Discrete Voronoi mesh
Fig. 10

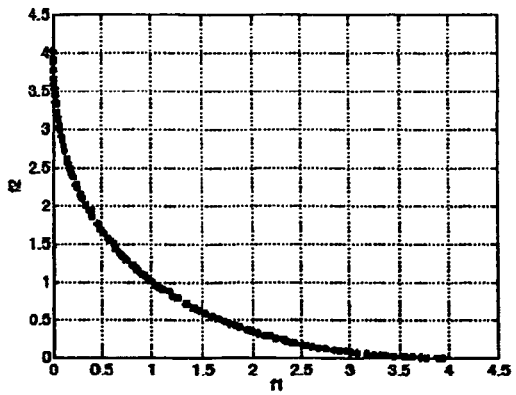
(a) VEDA (SCH1 ($n=2$))
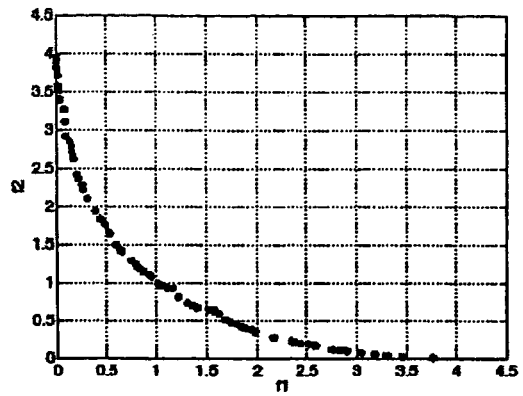
(b) NSGA-II (SCH1 ($n=2$))
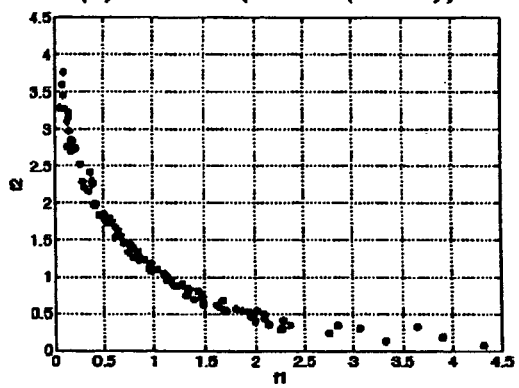
(c) VEDA (SCH1 ($n=5$))
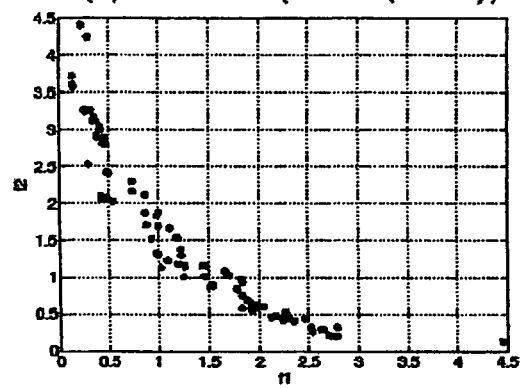
(d) NSGA-II (SCH1 ($n=5$))
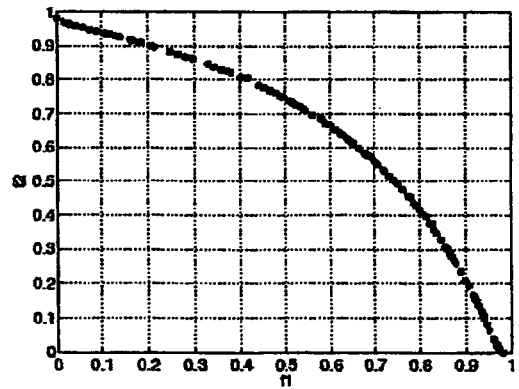
(e) VEDA (FON2 ($n=2$))
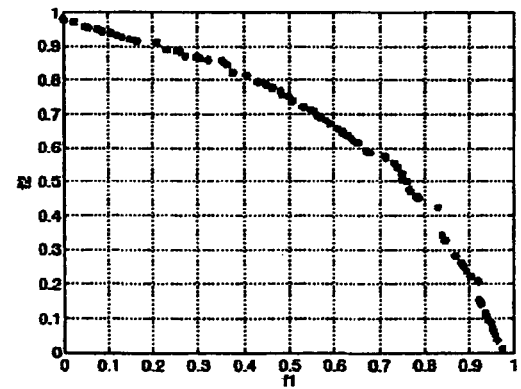
(f) NSGA-II (FON2 ($n=2$))
Fig. 14 (a)-(f)

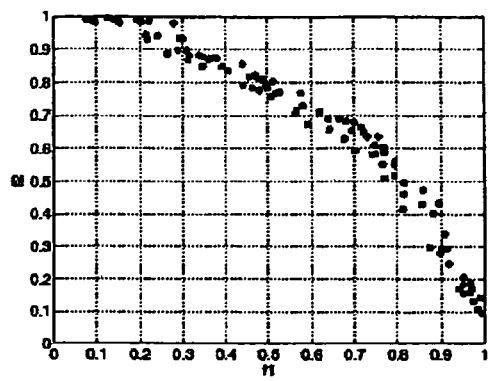
(g) VEDA (FON2 ($n = 5$))
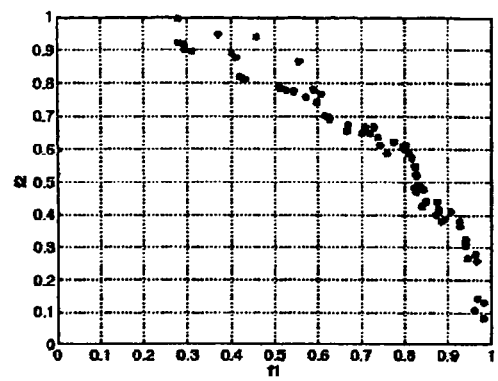
(h) NSGA-II (FON2 ($n = 5$))
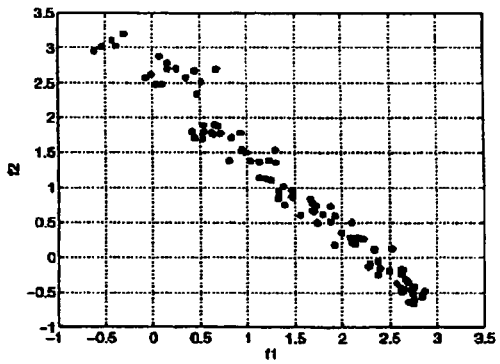
(i) VEDA (OKA4 ($n = 2$))
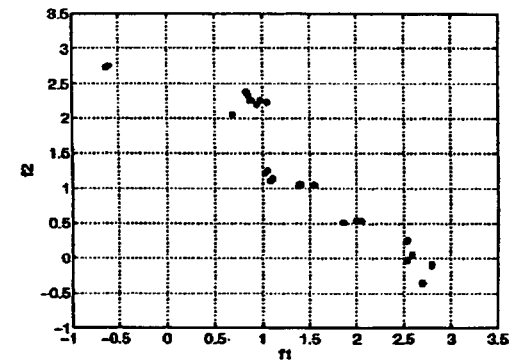
(j) NSGA-II (OKA4 ($n = 2$))
Fig. 14 (g)-(j)

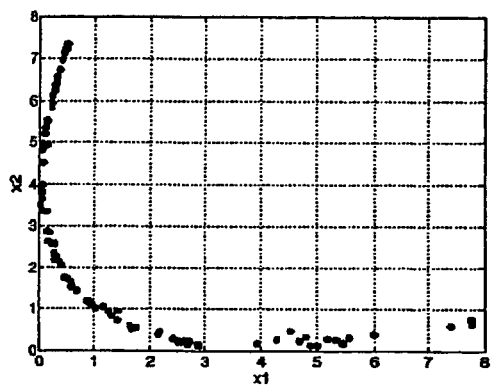 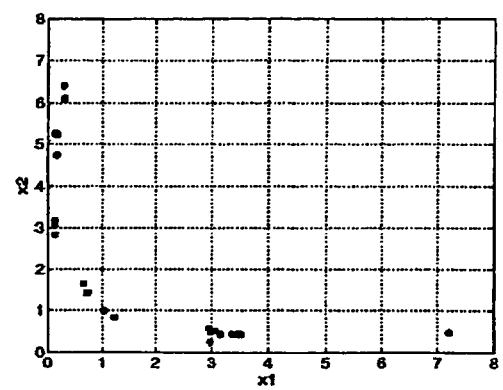
(a) VEDA (FON2 ($n = 5$))          (b) NSGA-II (FON2 ($n = 5$))
Fig. 15

SYSTEM AND METHOD FOR ESTIMATION OF A DISTRIBUTION ALGORITHM

CROSS-REFEFRENCE TO RELATED APPLICATIONS

This application is related to U.S. application Ser. No. 11/042,991 filed on Jan. 24, 2005.

FIELD OF THE INVENTION

The underlying invention generally relates to the field of Estimation of Distribution Algorithms (EDA), especially for optimization problems, including single-objective optimization (SOO) and multi-objective optimization (MOO).

BACKGROUND OF THE INVENTION

A Hybrid Representation proposed in Okabe, T., Jin, Y. and Sendhoff, B. Evolutionary Multi-Objective Optimisation with a Hybrid Representation, In Proceedings of Congress on Evolutionary Computation (CEC-2003), pages 2262-2269, 2003, which is incorporated by reference in its entirety, is exploiting the different dynamics of Genetic Algorithm (GA) and Evolution Strategy (ES). This difference is caused by the different offspring distribution. The new algorithm shows superior performance compared to the state-of-the-art MOO methods. A natural for the extension of the Hybrid Representation algorithm is to try to model the optimal offspring distribution directly. This new algorithm generates a stochastic model from the offspring distribution in the Parameter Space (PS). Based on this stochastic model, offspring will be generated. Neither crossover nor mutation are used. This type of algorithms is often called Estimation of Distribution Algorithm (EDA). FIG. 1 shows the difference between EAs (a) and EDAs (b) as it is known from conventional systems. Besides the way how they generate offspring, both of them are basically the same.

Genetic Algorithms (GAs) are well known to be powerful tools to obtain optimal solutions for complex optimization problems. As an extension of GAs, recently Estimation of Distribution Algorithms (EDAs) have received considerable attention, see Tsutsui, et al, cited below. The first authors to use the term "EDA" for estimating the distribution of promising points were Mühlenbein and Paass. In the state of the art, several EDAs have been proposed. Since the research for EDAs was triggered by the problem of disruption in GA, a lot of methods are suitable for discrete problems only. However, recently, several papers for the continuous problem have been also published.

According to a recent survey of EDAs, Pelikan, M., Goldberg, D. E. and Lobo, F. A Survey of Optimization by Building and Using Probabilistic Models. Technical Report 99018, University of Illinois, Urbana-Champaign Urbana, Ill. 61801, 1999 which is incorporated by reference herein in its entirety, the proposed methods can be classified into three classes: (1) no interaction, (2) pairwise interaction, and (3) multivariable interaction.

The first class, i.e. no interaction, does not consider any epistasis at all. Thus, each locus is treated independently. The second class, i.e., pairwise interaction, considers pairwise dependency only. Finally, multivariable interaction takes into account any type of dependency between variables.

The classification of the state of the art EDA methods can be seen in the following Table 1-a for discrete domains and in Table 1-b for continuous domains. All of the references cited in these tables are incorporated by reference herein in their entirety.

TABLE 1-a

EDA methods for discrete domains.

| | | |
|---|---|---|
| 1) No Interaction | Univariate Marginal Distribution Algorithm (UMDA) | Mühlenbein, H. and Mahnig, T. Evolutionary Algorithms: From Recombination to Search Distributions. In Theoretical Aspects of Evolutionary Computing, pages 135-173, 2000, and Mühlenbein, H. and Mahnig, T. Evolutionary Synthesis of Bayesian Networks for Optimization. Advances in Evolutionary Synthesis of Intelligent Agent, pages 429-455, 2001. |
| | Population Based Incremental Learning (PBIL) | Baluja, S. Population-Based Incremental Learning: A Method for Integrating Genetic Search Based Function Optimization and Competitive Learning. Technical Report CMU-CS-94-163, Carnegie Mellon University, 1994. |
| | Compact Genetic Algorithm (cGA) | Harik, G. R., Lobo, F. G. and Goldberg, D. E. The Compact Genetic Algorithm. Technical Report 97006, University of Illinois, Urbana-Champaign Urbana, IL 61801, 1997, and Harik, G. R., Lobo, F. G. and Goldberg, D. E. The Compact Genetic Algorithm. In Proceedings of Congress on Evolutionary Computation (CEC-1998), pages 523-528, 1998. |
| | Hill-Climing with Learning (HCwL) | Kvasnicka, V., Pelikan, M. and Pospichal, J. Hill Climbing with Learning (An Abstraction of Genetic Algorithm). Neural Network World, 6: 773-796, 1996. |
| | Incremental Univariate Marginal Distribution Algorithm (IUMDA) | Mühlenbein, H. The Equation for the Response to Selection and Its Use for Prediction. Evolutionary Computation, 5(3): 303-346, 1998. |
| | Reinforcement Learning Estimation of Distribution Algorithm (RELEDA) | Paul, T. K. and Iba, H. Reinforcement Learning Estimation of Distribution Algorithm. In Proceedings of Genetic and Evolutionary Computation Conference (GECCO-2003), pages 1259-1270, 2003. |

TABLE 1-a-continued

EDA methods for discrete domains.

| | | |
|---|---|---|
| 2) Pairwise Interaction | Mutual Information Maximization for Input Clustering (MIMIC) | de Bonet, J. S., Isbell, J., Charles, L. and Viola, P. MIMIC: Finding Optima by Estimating Probability Densities. Advances in Neural Information Processing Systems, 9: 424-431, 1996. |
| | Combining Optimizers with Mutual Information Trees (COMIT) | Baluja, S. and Davies, S. Combining Multiple Optimization Runs with Optimal Dependency Trees. Technical Report CMU-CS-97-157, Carnegie Mellon University, 1997. |
| | Bivariate Marginal Distribution Algorithm (BMDA) | Mühlenbein, H. and Mahnig, T. Evolutionary Synthesis of Bayesian Networks for Optimization. Advances in Evolutionary Synthesis of Intelligent Agent, pages 429-455, 2001, and Pelikan, M. and Mühlenbein, H. Marginal Distributions in Evolutionary Algorithms. In Proceedings of the Forth International Conference on Genetic Algorithms (Mendel-1998), pages 90-95, 1998. |
| 3) Multi-variable Interaction | Extended Compact Genetic Algorithm (ECGA) | Harik, G. R. Linkage Learning via Probabilistic Modeling in the ECGA. Technical Report 99010, University of Illinois, Urbana-Champaign Urbana, IL 61801, 1999, and Lobo, F. G. and Harik, G. R. Extended Compact Genetic Algorithm in C++. Technical Report 99016, University of Illinois, Urbana-Champaign Urbana, IL 61801, 1999. |
| | Factorized Distribution Algorithm (FDA) | Mühlenbein, H. and Mahnig, T. FDA - A Scalable Evolutionary Algorithm for the Optimization of Additively Decomposed Functions. Evolutioanry Computation, 7(1): 45-68, 1999, and Mühlenbein, H. and Mahnig, T. The Factorized Distribution Algorithm for Additively Decomposed Functions. In Proceedings of Congress on Evolutionary Computation (CEC-1999), pages 752-759, 1999, and Mühlenbein, H. and Mahnig, T. Evolutionary Synthesis of Bayesian Networks for Optimization. Advances in Evolutionary Synthesis of Intelligent Agent, pages 429-455, 2001. |
| | Polytree Approximatin of Distribution Algorithm (PADA) | Larrañaga, P. and Lozano, J. A., editor. Estimation of Distribution Algorithms. A New Tool for Evolutionary Computation. Kluwer Academic Publishers, 2002. |
| | Estimation of Bayesian Networks Algorithm (EBNA) | Larrañaga, P., Etxeberria, R., Lozano, J. A. and Pena, J. M. Optimization by Learning and Simulation of Bayesian and Gaussian Networks. Technical Report EHU-KZAA-IK-4/99, Department of Computer Science and Artificial Intelligence, University of the Basque Country, 1999. |
| | Bayesian Optimization Algorithm (BOA) | Khan, N., Goldberg, D. E. and Pelikan, M. Multi-objective Bayesian Optimization Algorithm. Technical Report 2002009, Univeristy of Illinois, Uvbana-Champaign, Urbana, IL 61801, 2002, and Laumanns, M. and Ocenasek, J. Bayesian Optimization Algorithms for Multi-objective Optimization. In Proceedings of Parellel Problem Solving from Nature VII (PPSN-VII), pages 298-307, 2002, and Pelikan, M., Goldberg, D. E. and Cantu-Pax, E. BOA: The Bayesian Optimization Algorithm. In Proceedings of Genetic and Evolutionary Computation Conference (GECCO-1999), pages 525-532, 1999, and Pelikan, M., Goldberg, D. E. and Cantu-Paz, E. Linkage Problem, Distribution Estimation and Bayesian Networks. Technical Report 98013, University of Illinois, Urbana-Champaign Urbana, IL 61801, 1998, and Pelikan, M., Goldberg, D. E. and Cantu-Paz, E. BOA: The Bayesian Optimization Algorithm. Technical Report 99003, University of Illinois, Urbana-Champaign Urbana, IL 61801, 1999, and Zhang, B.-T. A Bayesian Framework for Evolutionary Computation. In Proceedings of Congress on Evolutionary Computation (CEC-1999), pages 722-728, 1999. |
| | Learning Factorized Distribution Algorithm (LFDA) | Mühlenbein, H. and Mahnig, T. Evolutionary Synthesis of Bayesian Networks for Optimization. Advances in Evolutionary Synthesis of Intelligent Agent, pages 429-455, 2001. |

TABLE 1-a-continued

EDA methods for discrete domains.

| | | |
|---|---|---|
| Factorized Distribution Algorithm (FDA) (extended version) | | Larrañaga, P. and Lozano, J. A., editor. Estimation of Distribution Algorithms. A New Tool for Evolutionary Computation. Kluwer Academic Publishers, 2002. |

TABLE 1-b

EDA methods for continuous domains.

| | | |
|---|---|---|
| 1) No Interaction | Univariate Marginal Distribution Algorithm (UMDAC) | Larrañaga, P., Etxeberria, R., Lozano, J. A. and Peña, J. M. Optimization by Learning and Simulation of Bayesian and Gaussian Networks. Technical Report EHU-KZAA-IK-4/99, Department of Computer Science and Artificial Intelligence, University of the Basque Country, 1999. |
| | Stochastic Hill Climbing with Learning by Vectors of Normal Distributions (SHCLVND) | Rudlof, S. and Köppen, M. Stochastic Hill Climbing with Learning by Vectors of Normal Distributions. In Proceedings of the First Online Workshop on Soft Computing (WSC1), Nagoya, Japan, 1997. |
| | Population Based Incremental Learning (PBILC) | Sebag, M. and Ducoulombier, A. Extending Population-Based Incremental Learning to Continuous Search Spaces. In Proceedings of Parallel Problem Solving from Nature V (PPSN-V), pages 418-427, 1998. |
| 2) Pairwise Interaction | Mutual Information Maximization for Input Clustering (MIMICC) | Larrañaga, P., Etxeberria, R., Lozano, J. A. and Peña, J. M. Optimization by Learning and Simulation of Bayesian and Gaussian Networks. Technical Report EHU-KZAA-IK-4/99, Department of Computer Science and Artificial Intelligence, University of the Basque Country, 1999. |
| 3) Multivariable Interaction | Estimation of Multivariate Normal Algorithm (EMNA) Estimation of Gaussian Networks Algorithm (EGNA) Iterated Density Estimation Algorithm (IDEA) | Larrañaga, P. and Lozano, J. A., editor. Estimation of Distribution Algorithms. A New Tool for Evolutionary Computation. Kluwer Academic Publishers, 2002. Larrañaga, P. and Lozano, J. A., editor. Estimation of Distribution Algorithms. A New Tool for Evolutionary Computation. Kluwer Academic Publishers, 2002. Bosman, P. A. N. and Thierens, D. An Algorithmic Framework for Density Estimation Based Evolutionary Algorithms. Technical Report UU-CS-1999-46, Department of Computer Science, Utrecht University, 1999, and Bosman, P. A. N. and Thierens, D. Continuous Iterated Density Estimation Evolutionary Algorithms within the IDEA Framework. Technical Report UU-CS-2000-15, Department of Computer Science, Utrecht University, 2000, and Bosman, P. A. N. and Thierens, D. IDEAs Based on the Normal Kernels Probability Density Function. Technical Report UU-CS-2000-11, Department of Computer Science, Utrecht University, 2000, and Bosman, P. A. N. and Thierens, D. Mixed IDEAs. Technical Report UU-CS-2000-45, Department of Computer Science, Utrecht University, 2000, and Bosman, P. A. N. and Thierens, D. Negative Log-Likelihood and Statistical Hypothesis Testing as the Basis of Model Selection in IDEAs. In Proceedings of the Tenth Belgium-Netherlands Conference on Machine Learning, pages 109-116, 2000, and Bosman, P. A. N. and Thierens, D. Advancing Continuous IDEAs with Mixture Distributions and Factorization Selection Metrics. In Proceedings of the Optimization by Building and using Probabilistic Models OBUPM Workshop at the Genetic and Evolutionary Computation Conference (GECCO-2001), pages 208-212, 2001, and Thierens, D. and Bosmann, P. A. N. Multi-Objective Mixture-based Iterated Density Estimation Evolutionary Algorithms. In Proceedings of Genetic and Evolutionary Computation Conference (GECCO-2001), pages 663-670, 2001. |
| | Parzen Estimation of Distribution Algorithm (PEDA) | Costa, M. and Minisci, E. MOPED: A Multi-objective Parzen-based Estimation of Distribution Algorithm for Continuous Problems. In Proceedings of the Second |

TABLE 1-b-continued

EDA methods for continuous domains.

| | |
|---|---|
| Marginal Histgram Model (MHM) | International Conference on Evolutionary Multi-Criterion Optimization (EMO-2003), pages 282-294, 2003.<br>Tsutsui, S., Pelikan, M. and Goldberg, D. E. Probabilistic Model-building Genetic Algorithms Using Marginal Histograms in Continuous Domain. In Proceedings of the KES-2001, Knowledge-based Intelligent Information Engineering Systems and Allied Technologies, volume 1, pages 112-121, and Tsutsui, S., Pelikan, M. and Goldberg, D. E. Evolutionary Algorithm Using Marginal Histogram Models in Continuous Domain. Technical Report 2001019, University of Illinois, Urbana-Champaign Urbana, IL 61801, 2001. |

Since the method proposed by the present invention belongs to the class of multivariable interaction, some of the popular methods in this category will be explained next.

To learn the linkage among parameters and therefore the structure of the problem, Bayesian networks are used. With the Bayesian Networks, the conditional probability is approximated. Each node and connection in the Bayesian networks correspond to the parameters and the conditional probability, respectively. Finally, the factorized probability is used to generate offspring. Recently, this method has been applied to MOO problems and has gathered much attention as per Khan, N., Goldberg, D. E. and Pelikan, M. Multi-objective Bayesian Optimization Algorithm. Technical Report 2002009, Univeristy of Illinois, Urbana-Champaign, Urbana, Ill. 61801, 2002 and Laumanns, M. and Ocenasek, J. Bayesian Optimization Algorithms for Multi-objective Optimization. In Proceedings of Parellel Problem Solving from Nature VII (PPSN-VII), pages 298-307, 2002 which are incorporated by reference herein in their entirety. Iterated Density Estimation Evolutionary Algorithm (IDEA)

Bosman and Thierens have proposed four types of EDAs that all belong to the class of IDEA. The first one is for the discrete domain where the conditional probability is used to build up the stochastic model. The others are for the continuous domain. A normalized Gaussian, a histogram method and a kernel method are used to generate the stochastic model. The kernel based method has been also applied to MOO, called Mixture-based IDEA (MIDEA).

Parzen-Based Estimation of Distribution Algorithm (PEDA)

To generate the stochastic model, a Parzen estimator is used to approximate the probability density of solutions. Based on the stochastic model, new offsprings will be generated. This method has been used for MOO problems.

Marginal Histogram Model (MHM)

For each parameter, the search space is divided into small bins. The ratio of the number of individuals in each bin to the whole number is assigned as the selection probability. With this probability, a bin is selected randomly. In the selected bin, an offspring is generated uniformly.

In view of these references, it is the object of the present invention to propose a more efficient algorithm for optimization.

SUMMARY OF THE INVENTION

A new algorithm, which can be called Voronoi-based Estimation of Distribution Algorithm (VEDA), is using a Voronoi mesh to represent the stochastic model. The Voronoi mesh is usually used in another context, i.e. finite element methods (FEMs) for generating the mesh. The mesh covers the parameter space. Each cell of the mesh is represented by its center. The rank of the center is determined by the fitness of the individuals belonging to its cell.

One of the characteristics of VEDA is to exploit all available information. In the canonical EAs and EDAs, only selected (promising) individuals contribute to the generation of offspring. However, even solutions of poor quality can serve as "bad examples", therefore, they are not ignored but exploited by the technique according to the present invention. In particular, in the context of complex optimization problems with computationally expensive evaluations, it is of importance to use essentially all available information. In the context of EDAs poor solutions are helpful as they induce a low probability of the stochastic model in their neighborhood in the parameter space.

To generate offspring efficiently, clustering and Principal Component Analysis (PCA) are used in VEDA. In particular, in higher dimensional cases, it becomes more time consuming to generate the stochastic model. To reduce the computational cost, both techniques are used.

The basic idea behind the Voronoi-based Estimation of Distribution Algorithm (VEDA) stems from the observations on the intrinsic interplay between the distributions in the parameter space and in the fitness space. On the one hand, it is sensible to directly estimate the most appropriate search distribution for multi-objective optimization problems. Therefore, EDAs is a sensible starting point. On the other hand, both in canonical evolutionary algorithms as well as in EDAs, individuals which are not selected are completely discarded, see FIG. 2. The information that they carry, i.e. "do not search close to this solution again", is wasted. In particular, in the context of distribution based algorithms, this does not seem sensible. If a human operator would choose the next generation, he/she would certainly take this "negative" information into account. Thus, the second target of the VEDA is to exploit not just the "good" individuals in the selection process but also low-performance individuals as "bad examples".

One aspect of the invention relates to the offspring distribution in the Parameter Space (PS) with the information given in the Fitness Space (FS). Based on the offspring, a stochastic model is generated from which the next generation will be determined.

BRIEF DESCRIPTION OF THE DRAWINGS

Further advantages of the underlying invention result from the subordinate claims as well as from the following description of two preferred embodiments of the invention which are depicted in the following drawings.

FIG. 1 shows the difference between known Evolutionary Algorithms (EAs) and known Estimation of Distribution Algorithms (EDAs) by depicting the basic flow of EAs (a) and EDAs (b).

FIG. 10 shows a discrete Voronoi mesh.

FIG. 14 shows the results of VEDA and NSGA-II.

FIG. 15 shows the solutions in the PS on OKA4 by VEDA and NSGA-II.

DETAILED DESCRIPTION OF THE INVENTION

Note that all references to prior are documents in brackets are to be understood as explicitly referring to these documents and incorporating the disclosure thereof by reference. According to the invention, a new algorithm for tackling optimization problems, including Single-Objective Optimization (SOO) and Multi-Objective Optimization (MOO), is proposed, namely the Voronoi-based Estimation of Distribution Algorithm (VEDA).

Based on the offspring distribution in the PS with the information given in the FS, a stochastic model is generated using a Voronoi mesh. With the model, the offspring are generated stochastically.

Figure 2:
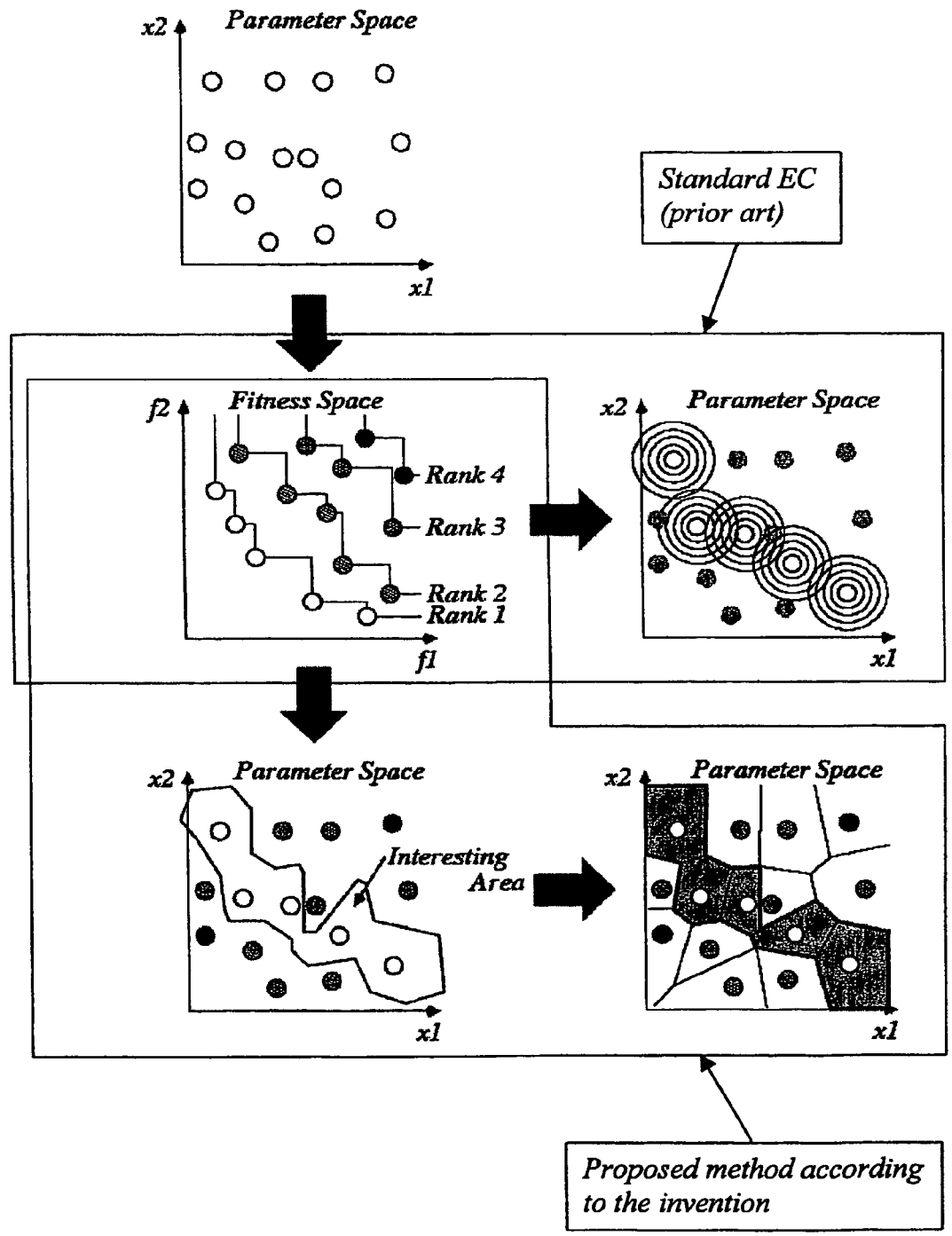
FIG. 2 shows the basic idea of Voronoi-based Estimation of Distribution Algorithm (VEDA) according to one aspect of the present invention, wherein the offspring distribution in the PS with the information given in the FS are used to generate the promising offspring.
Figure 3:
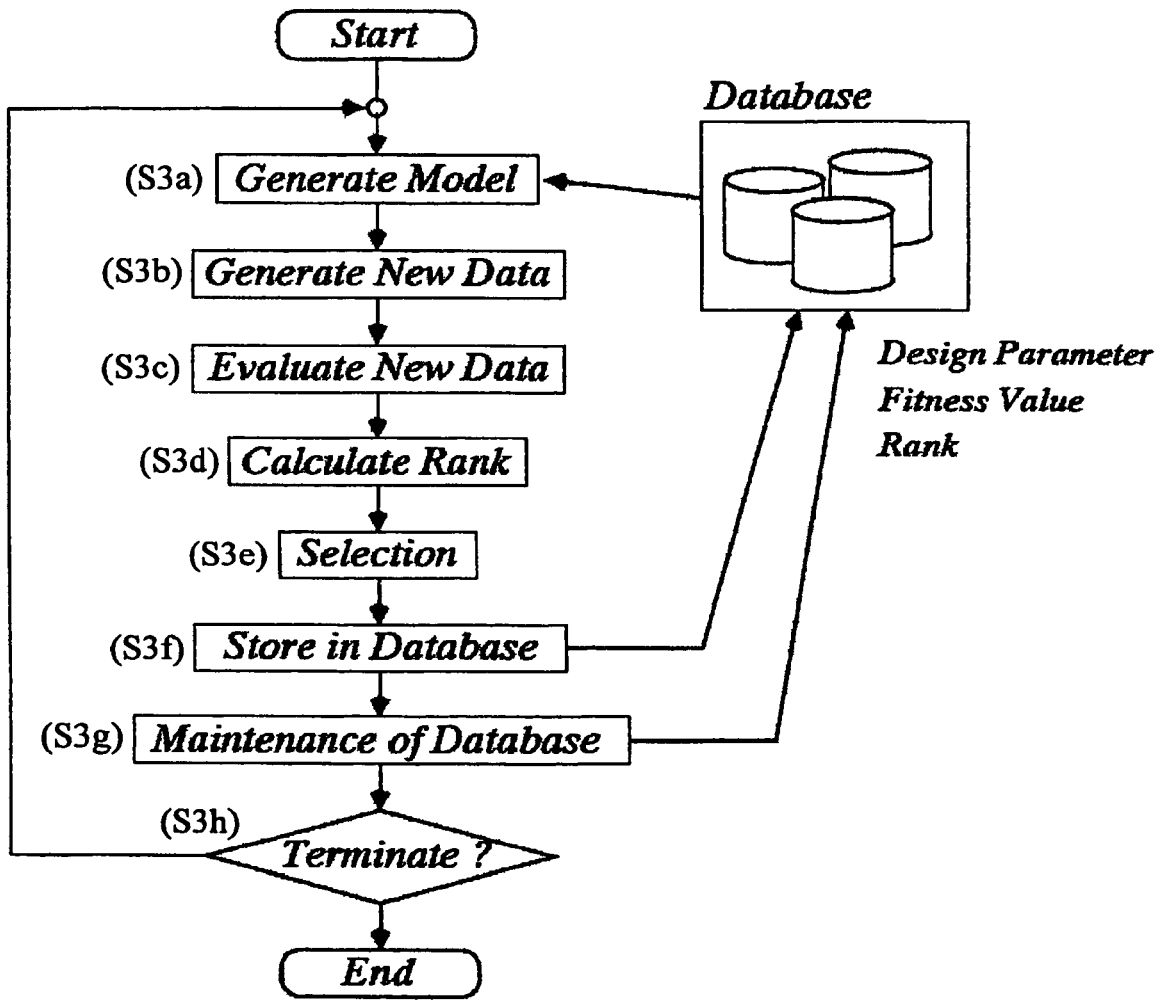
FIG. 3 shows the basic flow of VEDA.

The basic flow of VEDA is shown in FIG. 3. Since some issues of EDAs as described by Pelikan, M., Goldberg, D. E. and Lobo, F. A Survey of Optimization by Building and Using Probabilistic Models. Technical Report 99018, University of Illinois, Urbana-Champaign Urbana, Ill. 61801, 1999, which is incorporated by reference herein in its entirety include (1) how to make a stochastic model, and (2) how to generate new offspring with the stochastic model, the detailed flows for these steps are shown in FIGS. 4(a) and (b), respectively.

FIG. 3 explains the overall flow of VEDA concept according to the present invention. First, the stochastic model will be generated from a database (S3a). If the database does not exist yet, initial data will be generated (S1a) randomly and evaluated (S1b). Based on the generated model, new promising individuals will be generated (S3b) and evaluated (S3c). With the fast ranking method, see Deb, K., Pratap, A., Agarwal, S. and Meyarivan, T. A Fast and Elitist Multiobjective Genetic Algorithm: NSGA-II. IEEE Transactions on Evolutionary Computation, 6(2):182-197, 2002, which is incorporated by reference herein in its entirety, the rank of the individuals will be calculated (S3d). Using the crowded tournament selection, individuals will be selected (S3e) and stored (S3f) in the database. The non-selected individuals will be stored in a different database as "bad examples". By adding new data in the database, the rank information will become incorrect. Since the rank of the former data was calculated without the latest data, the rank of them should be updated (S3g). If a given terminal condition is met, VEDA will stop, otherwise the same flow will be repeated (S3h). In the database, design parameters, fitness values and rank are stored.

Figure 4:
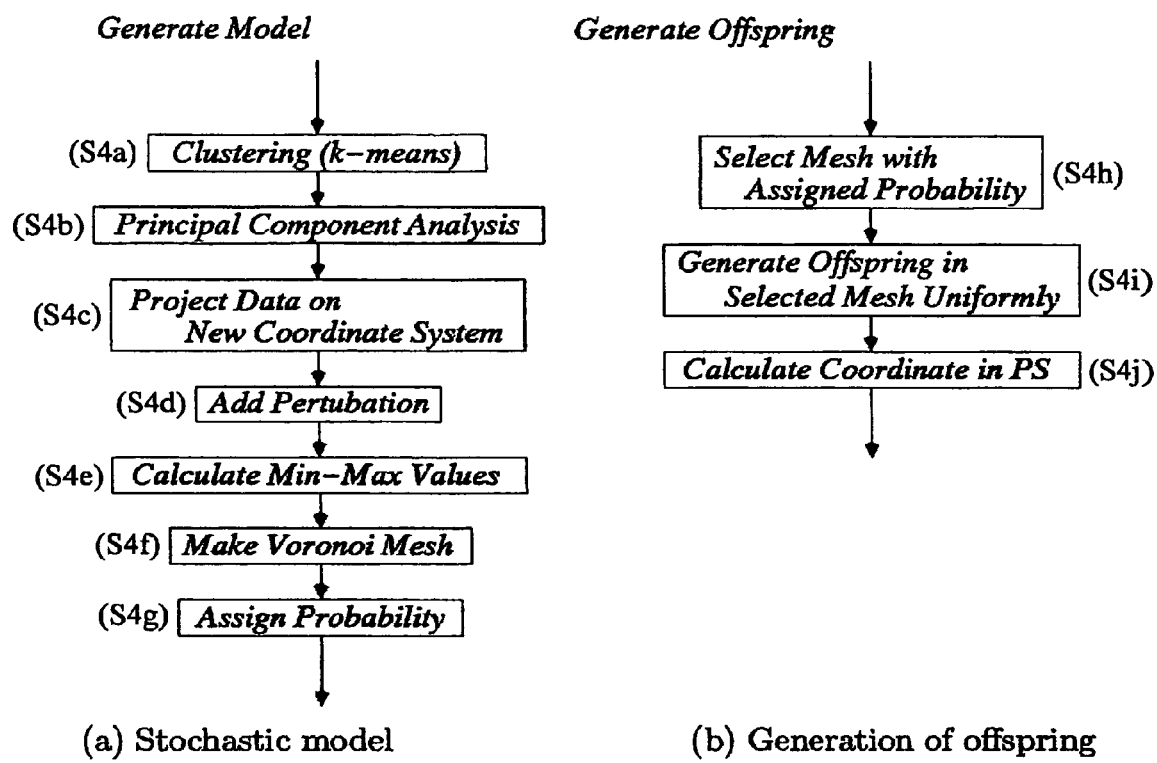
FIG. 4 shows the detailed flow in VEDA and particularly the flow of generating a stochastic model (a) and the flow of generating offspring (b).

FIG. 4 explains the details of the approach to build up the model and to generate offspring. To generate the stochastic model, a clustering is used (S4a), see Kaufman, L. and Rousseeuw, P. J. Finding Groups in Data—An Introduction to cluster Analysis. Wiley-Interscience, 1990 which is incorporated by reference herein in its entirety. In each cluster, Principal Component Analysis (PCA) is carried out (S4b) to get the principal axis and the orthogonal axis of the distribution. See Hyvärinen, A. Independent Component Analysis. Wiley-Interscience, 2001 and Jolliffe, I. T. Principal Component Analysis. Springer Verlag, 2002 which are incorporated by reference herein in their entirety. The data will be projected (S4c) to the new coordinate system determined by PCA. Some additional measures like adding a perturbation (S4d) to the model have to be taken to avoid local minima, which is explained below in the section "Perturbation of Offspring Distribution". The minimum and maximum value for each axis is then calculated (S4e). Since PCA was carried out, epistasis among the design parameters should be minimal. In the new coordinate system, a Voronoi mesh is generated (S4f) as the stochastic model. Based on the assigned rank, the probability will be calculated for each cell (S4g).

To generate a new individual, a cell is selected (S4h) based on the assigned probability. After choosing a cell, a new individual is generated (S4i) in the selected cell uniformly. Finally, the new individual is projected (S4j) to the real coordinate system. In a further embodiment of the present invention, a system for optimization problems, including Single-Objective Optimization (SOO) and Multi-Objective Optimization (MOO), comprising means for carrying out the steps of the presented optimization method is proposed. The use of this method can be for optimizing aerodynamic or hydrodynamic designs.

The following items distinguish the VEDA concept according to the present invention over a histogram method with a Voronoi mesh:

1. The shape of a mesh in VEDA will change automatically. Since VEDA uses a Voronoi mesh, the shape of a mesh is not fixed.
2. The number of data in a cell is not counted. Although a histogram method needs a huge number of data, VEDA needs only few data.
3. VEDA uses a rank instead of frequency of data in a cell. Although a histogram method is based on frequency of data in a cell, VEDA does not use the frequency. Thus, VEDA can reduce the number of data to generate a stochastic model.
4. VEDA generates a different stochastic model from a histogram method. Since a histogram method is based on frequency of data in a cell, the cell without data has the lowest probability. However, the probability in a cell without data is approximated using the nearest data in VEDA. Thus, the probability in the cell without data is not always the lowest probability.

Since the way to make the model and generate offspring are issues in EDAs, each step is explained in more detail in the following sections.

Clustering

In the VEDA proposed in the present invention, data clusters are determined in the first step. The reason is that it is easier and more efficient to determine several local stochastic models, i.e. one for each cluster, instead of one global model.

Figure 5:
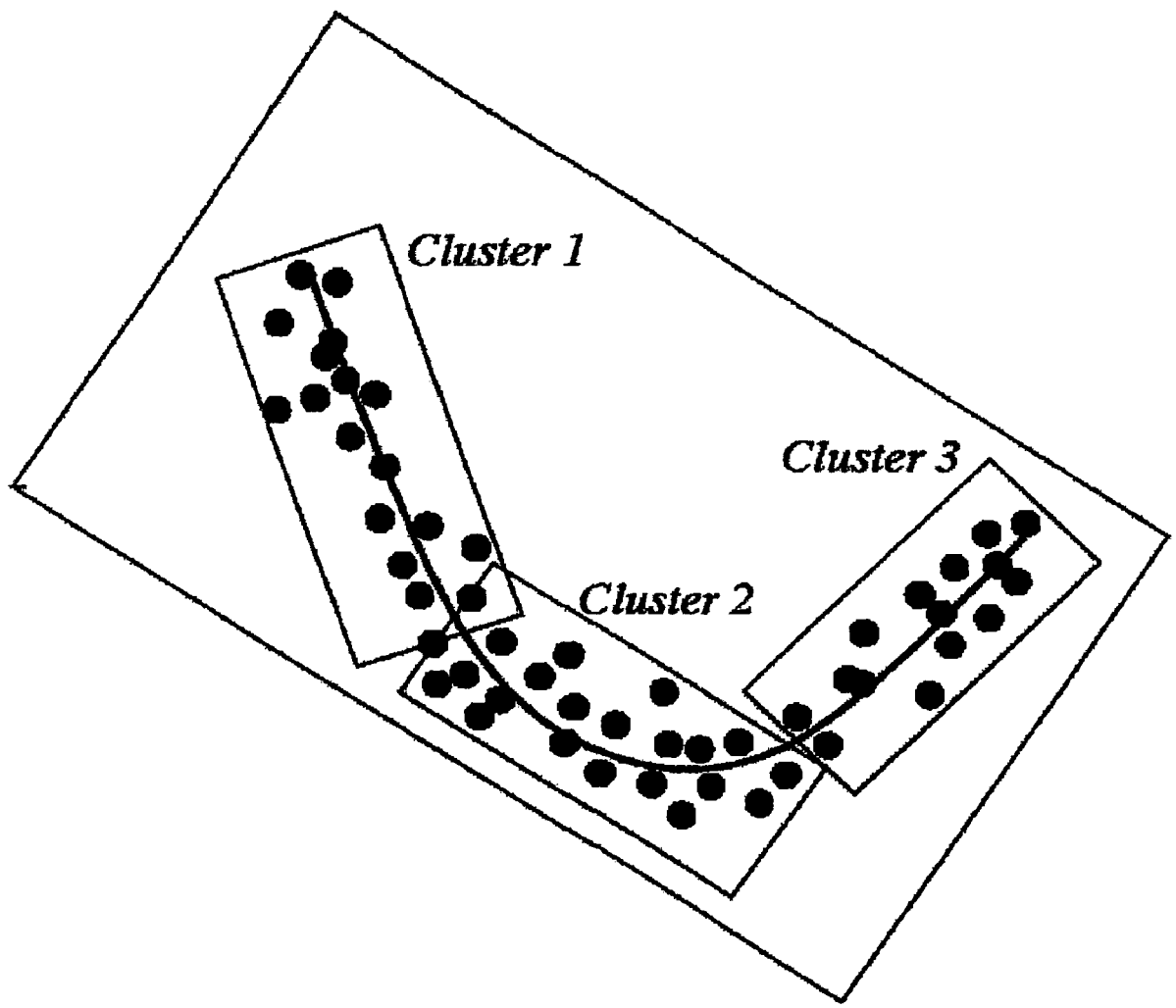
FIG. 5 shows three clusters determined by k-means clustering whereby it is obvious that it is easier to identify stochastic models for each of the clusters separately instead of for the whole data set.

Furthermore, FIG. 5 illustrates that also fewer empty cells will occur when using a clustering method. FIG. 5 shows three clusters determined by k-means clustering. It is obvious that it will be easier to identify stochastic models for each of the clusters separately instead of for the whole data set.

In the context of the present invention, e.g. k-means clustering proposed by MacQueen in Kaufman, L. and Rousseeuw, P. J. Finding Groups in Data—An Introduction to cluster Analysis. Wiley-Interscience, 1990 can be used, which is incorporated by reference herein in its entirety. The calculation of k-means clustering proceeds via the following steps:

1. An initial partition of the data into k non-empty subsets is randomly generated.
2. Seed points as the centroids of the clusters of the current partition are computed.
3. Each datum is assigned to the cluster with the nearest seed point. If data change from one cluster to another, the seed points are recalculated.
4. If no change in the assignment of data has occurred, stop. If there has been changed, go to step 2.

As pointed out in Kaufman et al, the drawback of k-means clustering is the dependency on the order of the data.

To use the k-means clustering, one has to determine the value of k, i.e. the number of clusters. In this work, the value of k will be determined at random within a range of [1, 10]. Better performance can be reached when k is set using some a priori knowledge on the Pareto front in the parameter space, e.g., the number of cluster can be determined by the number of disconnected pieces of the Pareto front. This also indicates why k=1, i.e. no clustering, can be viable choice, e.g., for SCH1.

Principal Component Analysis

Figure 6:
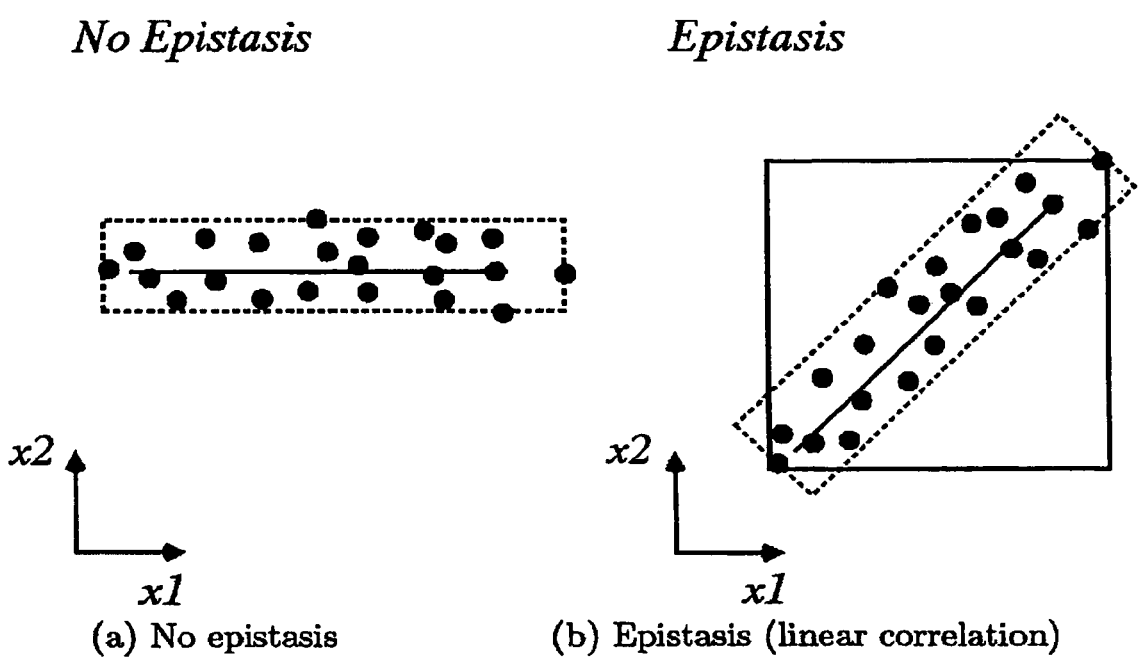
FIG. 6 shows sample data sets for data without epistasis (a) and data with epistasis (b).

To reduce the dimensionality and to generate the model efficiently, Principal Component Analysis (PCA) is used. FIG. 6 shows two different data sets. If there is epistasis between the variables, see FIG. 6(b), it is reasonable to map them into a coordinate system minimizing the linear correlations, see FIG. 6(a). Thereby, we can reduce the dimensionality and generate the model efficiently.

The PCA can be explained as follows (see Takahashi, M. and Kita, H. A Crossover Operator Using Independent Component Analysis for Real-coded Genetic Algorithms. In Proceedings of Congress on Evolutionary Computation (CEC-2001), pages 643-649, 2001 which is incorporated by reference herein in its entirety for additional details). Suppose there exist m sets of data of n variables, which are represented by an n×m matrix $$X=\{xij\}(i=1,\ldots,n,j=1,\ldots,m).$$

The variance-covariance matrix $S=\{sij\}$ of X is given by:

$$S_{ij} = \frac{1}{m-1} \cdot \sum_{k=1}^{m} x_{ik} x_{jk} \qquad \text{(Eq. 1)}$$

where data are normalized in advance so that the mean of each variable becomes zero. Transforming the data X with an n×m matrix A to Y=AX, the variance-covariance matrix $$S' = \{s'ij\}, s'ij = \frac{1}{m-1} \cdot \sum_{k=1}^{m} y_{ik} y_{jk} \text{ of } Y = \{yij\}$$

is given by:

$$S'=ASA^T \qquad \text{(Eq.2)}$$

The target of the principal component analysis (PCA) is to find a matrix A that makes S' the identity matrix. That is, to find a matrix that eliminates the correlation among variables of Y. Since S is a real symmetric matrix, there exists an orthogonal matrix P and a diagonal matrix $\Lambda$ such that $P^T SP=\Lambda$. A diagonal matrix $\Lambda$ whose diagonal elements are eigen values $\lambda 1,\ldots,\lambda n$ of S, and a matrix P whose columns are corresponding eigenvectors are a pair of such matrices. Hence, one obtains:

$$S'=(AP)\Lambda(AP)^T \qquad \text{(Eq. 3)}$$

To make S' the identity matrix, a transformation matrix A can be obtained as follows:

$$A = diag\left(\frac{1}{\sqrt{\lambda_1}}, \frac{1}{\sqrt{\lambda_2}}, \ldots, \frac{1}{\sqrt{\lambda_n}}\right) P^T \qquad \text{(Eq. 4)}$$

Assuming all the eigenvalues are positive, we can obtain the inverse transformation A−1 as follows:

$$A^{-1}=P \text{ diag}(\sqrt{\lambda_1}, \sqrt{\lambda_2}, \ldots, \sqrt{\lambda_n}) \qquad \text{(Eq. 5)}$$

Perturbation of Offspring Distribution

In the research for Real-Coded Genetic Algorithms (RC-GAs), the PCA or Gram-Schmidt orthogonalization are also often used. See Deb, K. A Population-based Algorithm-generator for Real-parameter Optimization. Technical Report 2003003, Indian Institute of Technology, Kanpur: Kanpur Genetic Algorithms Laboratory (KanGAL), Kanpur, PIN 208 016, India, 2003, and Deb, K., Anand, A. and Joshi, D. A Computationally Efficient Evolutionary Algorithms for Real-parameter Optimisation. Evolutionary Computation, 10(4): 371-395, 2002, and Deb, K. and Agrawal, R. B. Simulated Binary Crossover for Continuous Search Space. Complex Systems, 9:115-148, 1995, and Deb, K. and Beyer, H. -G. Self-adaptation in Real-parameter Genetic Algorithms with Simulated Binary Crossover. In Proceedings of Genetic and Evolutionary Computation Conference (GECCO-1999), pages 172-179, 1999, and Eshelman, L. J. and Schaffer, J. D. Real-coded Genetic Algorithms and Interval-schemata. In Proceedings of Foundations of Genetic Algorithms 2 (FOGA-2), pages 187-202, 1993, and Eshelman, L. J., Mathias, K. E. and Schaffer, J. D. Crossover Operator Biases: Exploiting the Population Distribution. In Proceedings of the Seventh International Conference on Genetic Algorithms, pages 354-361, 1997, and Kita, H., Ono, I. and Kobayashi, S. Multi-parental Extension of the Unimodal Normal Distribution Crossover for Real-coded Genetic Algorithms. In Proceedings of Congress on Evolutionary Computation (CEC-1999), volume 2, pages 1581-1587, 1999, and Ono, I. Genetic Algorithms for Optimization Taking Account of Characteristics Preservation (Japanese). PhD thesis, Tokyo Institute of Technology, 1997, and Ono, I. and Kobayashi, S. A Real-coded Genetic Algorithm for Function Optimization Using Unimodal Normal Distribution Crossover. In Thomas Back, editor, Proceedings of the Seventh International Conference on Genetic Algorithms, pages 246-253, 1997, and Ono, I., Kita, H. and Kobayashi, S. A Robust Real-Coded Genetic Algorithm using Unimodal Normal Distribution Crossover Augmented by Uniform Crossover: Effects of Self-Adaptation of Crossover Probabilities. In Proceedings of Genetic and Evolutionary Computation Conference (GECCO-1999), volume 1, pages 496-503, 1999, and Ono, I., Satoh, H. and Kobayashi, S. A Real-coded Genetic Algorithm for Function Optimization Using the Unimodal Normal Distribution Crossover (Japanese). Journal of Aritificial Intelligence, 14(6):1146-1155, 1999, and Takahashi, M. and Kita, H. A Crossover Operator Using Independent Component Analysis for Real-coded Genetic Algorithms. In Proceedings of Congress on Evolutionary Computation (CEC-2001), pages 643-649, 2001, and Tsutsui, S. Sampling Bias and Search Space Boundary Extension in Real Coded Genetic Algorithms. In Proceedings of Genetic and Evolutionary Computation Conference (GECCO-2000), pages 211-218, 2000, and Tsutsui, S. and Goldberg, D. E. Search Space Boundary Extension Method in Real-coded Genetic Algorithms. Information Sciences, 133(3-4):229-247, 2001, and Tsutsui, S. and Goldberg, D. E. Simplex Crossover and Linkage Identification: Single stage Evolution vs. Multi-stage Evolution. In Proceedings of Congress on Evolutionary Computation (CEC-2002), pages 974-979, 2002, and Tsutsui, S., Goldberg, D. E. and Sastry, K. Simplex Crossover and Linkage Learning in Real-coded GAs. In Proceedings of Genetic and Evolutionary Computation Conference (GECCO-2001), page 785, 2001, and Tsutsui, S., Yamamura, M. and Higuchi, T. Multi-parent Recombination with Simplex Crossover in Real Coded Genetic Algorithms. In Proceedings of Genetic and Evolutionary Computation Conference (GECCO-1999), pages 657-664, 1999, and Ueda, T., Koga, N. and Okamoto, M. Efficient Numerical Optimization Technique Based on Real-coded Genetic Algorithm. Genome Informatics, 12:451-453, 2001. All of these references are incorporated by reference herein in their entirety.

Figure 7:
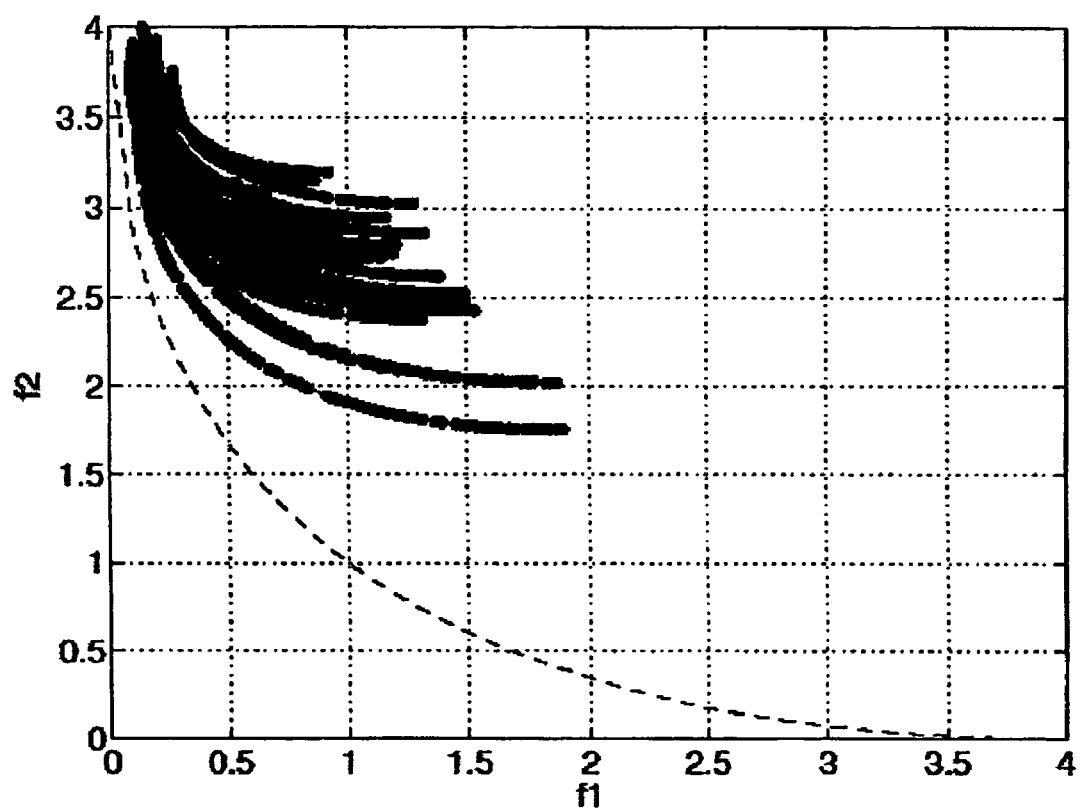
FIG. 7 shows the results of Unimodal Normal Distribution Crossover (UNDX) on SCH1 (n=50).

Unimodal Normal Distribution Crossover (UNDX), Bimodal Normal Distribution Crossover (BNDX), Parent-Centric Recombination (PCX), Modified PCX (mPCX) are examples of the usage of orthogonalization. See Ono, I. and Kobayashi, S. A Real-coded Genetic Algorithm for Function Optimization Using Unimodal Normal Distribution Crossover. In Thomas Bäck, editor, Proceedings of the Seventh International Conference on Genetic Algorithms, pages 246-253, 1997, and Ono, I., Kita, H. and Kobayashi, S. A Robust Real-Coded Genetic Algorithm using Unimodal Normal Distribution Crossover Augmented by Uniform Crossover: Effects of Self-Adaptation of Crossover Probabilities. In Proceedings of Genetic and Evolutionary Computation Conference (GECCO-1999), volume 1, pages 496-503, 1999, and Takahashi, M. and Kita, H. A Crossover Operator Using Independent Component Analysis for Real-coded Genetic Algorithms. In Proceedings of Congress on Evolutionary Computation (CEC-2001), pages 643-649, 2001, and Ueda, T., Koga, N. and Okamoto, M. Efficient Numerical Optimization Technique Based on Real-coded Genetic Algorithm. Genome Informatics, 12:451-453, 2001, and Deb, K. A Population-based Algorithm-generator for Real-parameter Optimization. Technical Report 2003003, Indian Institute of Technology, Kanpur: Kanpur Genetic Algorithms Laboratory (KanGAL), Kanpur, PIN 208 016, India, 2003 which are all incorporated by reference herein in their entirety. However, the usage of orthogonalization in MOO has problems, see FIG. 7, where the result of UNDX on SCH1 with 50 dimension is shown.

Figure 8:
FIG. 8 shows that the search power for the orthogonal direction will be lost, if all solutions are on one line.

Clearly, the solution sets are not on the Pareto front. However, they seem to be on similar curves. Taking a closer look, we can find out the reason for this problem. If all solutions are on one line in the parameter space, the search power of the orthogonalization will be lost. A rough image is drawn in FIG. 8, where it can be seen that the search power for the orthogonal direction is lost if all solutions are on one line. Since all solutions lie on one line which is not the Pareto front, all offspring will be generated on this line. Thus, there is no way to find the Pareto front. The curves that can be seen in FIG. 7 correspond to the situation described above where the orthogonalization fails. The effect can be regarded as a kind of premature convergence.

Figure 9:
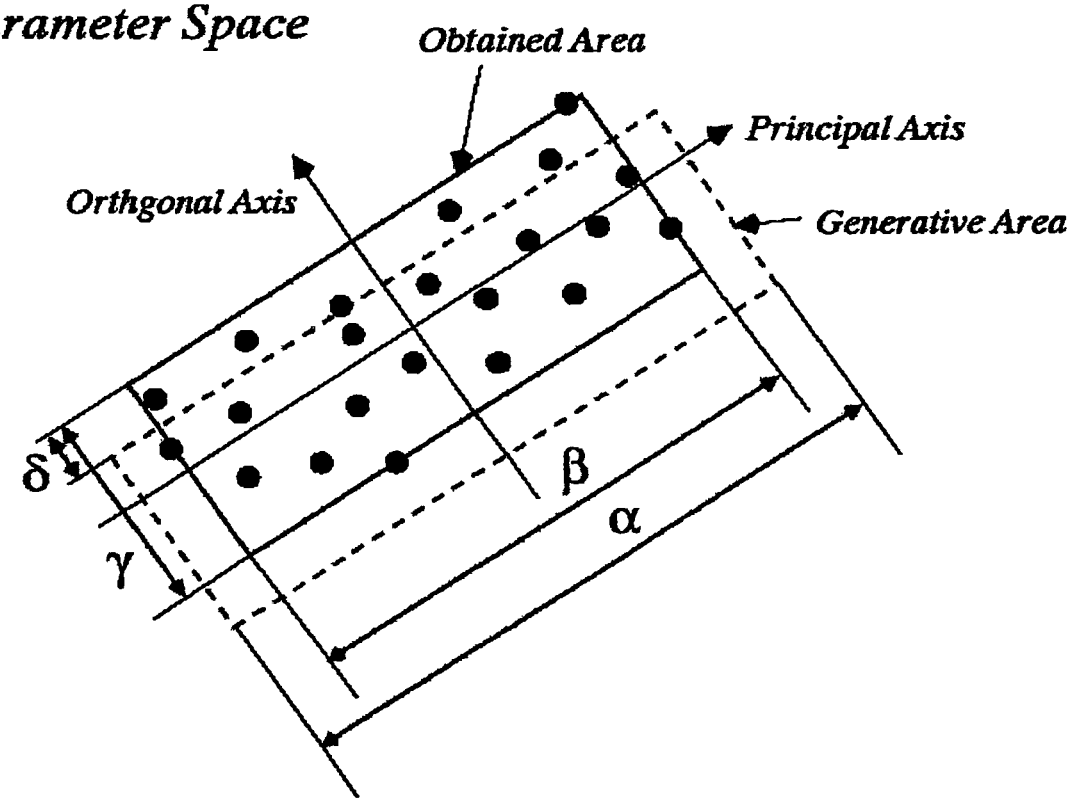
FIG. 9 shows perturbation added in the orthogonal direction and extension in the principal direction, $\beta$ and $\gamma$ being the differences between the maximum value and the minimum value in the principal and the orthogonal direction, $\delta$ being the perturbation in the orthogonal direction, and $\alpha$ being the extension for the principal direction.

To avoid this undesirable convergence, perturbation is introduced. FIG. 9. shows perturbation added in the orthogonal direction and extension in the principal direction, $\beta$ and $\gamma$ being the differences between the maximum value and the minimum value in the principal and the orthogonal direction, $\delta$ being the perturbation in the orthogonal direction, and $\alpha$ being the extension for the principal direction.

In FIG. 9, the "obtained area" is given by the maximum and the minimum value in each direction. The width of the obtained area are $\beta$ and $\gamma$ in the principal direction and the orthogonal direction, respectively. If $\gamma$ becomes zero, $\gamma$ is set to 0.01 $\beta$. Basically, offspring will be generated in this obtained area. However, if offspring are generated in this area only, the above problem can occur. Thus, perturbation is introduced. The "obtained area" is shifted in the orthogonal direction by an offset $\delta$ given by $\delta=\pm 0.25\ \beta$. The direction, i.e., "+" or "−", is chosen randomly. Furthermore, the width $\beta$ is enlarged: $\alpha=1.25\ \beta$. The new "generative area" is given by $\alpha$ times $\gamma$ shifted by $\delta$. Although several parameters were introduced, the performance of VEDA is robust against these parameters. Thus, we fix these parameters through this work.

Voronoi-based Stochastic Model

Voronoi mesh is defined as follows:

Given a set S of m data points in $\Re^n$, Voronoi mesh is the partition of $\Re^n$ into m polyhedral cells, $v(p)(p \in S)$. Each cell $v(p)$, namely Voronoi mesh of p, is defined as the set of points in $\Re^n$ which are closer to p than to any other points in S, or more precisely, $$v(p)=\{x \in \Re^n; dist(x, p) \leq dist(x, q) \forall q \in S\backslash p\} \quad (Eq.\ 6)$$

where dist( ) is the Euclidean distance.

In the generated area in FIG. 9, a Voronoi mesh is calculated in the following way:

1. The rank for all data in the generated area is determined.
2. The probability of each cell is determined by the nearest data.

Figure 11:
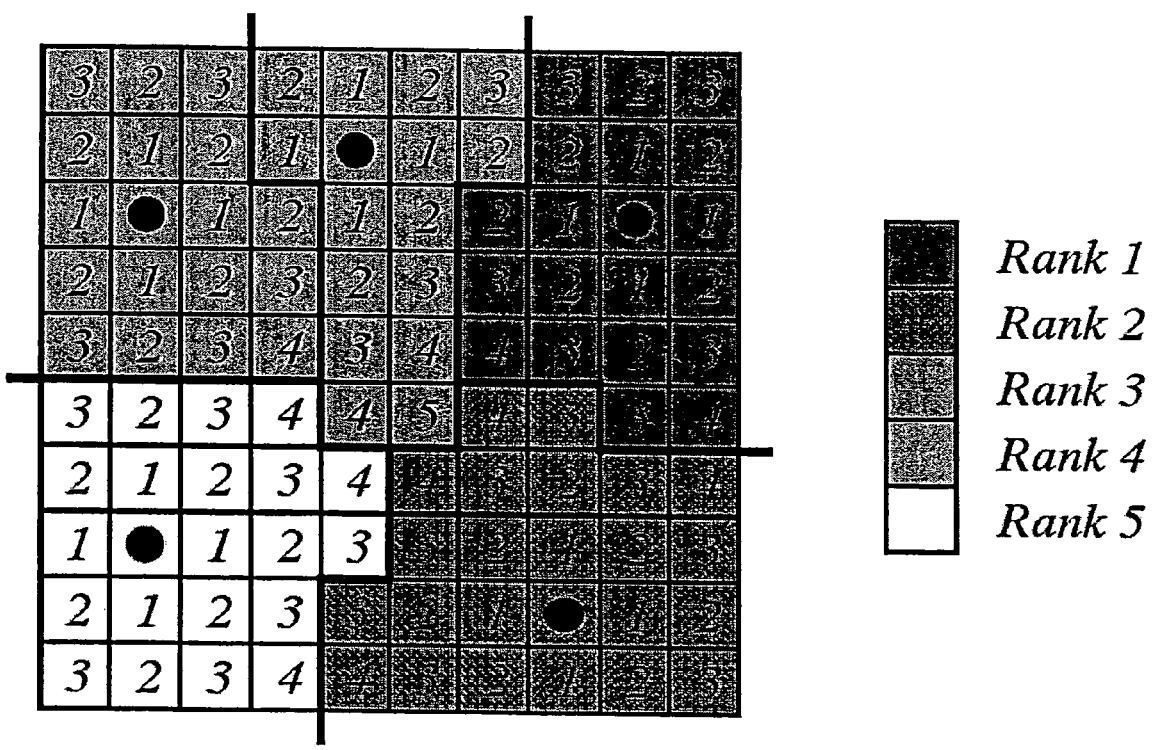
FIG. 11 shows the sample flow of generation of the Voronoi mesh, wherein the thicker lines outline the boundary of the Voronoi mesh.

To simplify the generation of the Voronoi mesh, a discrete Voronoi mesh is used, see FIG. 10. The space is divided into small cells. The Voronoi mesh will be generated with these small cells. FIG. 11 shows the sample flow for the generation of the Voronoi mesh. The thicker lines outline the boundary of the Voronoi mesh.

First of all, a space is divided into small cells, see FIG. 11. The filled circles in FIG. 11 are data. As the first step, neighbors of each datum are grouped. This step is indicated by 1 in FIG. 11. As the second step, from the neighbors indicated by 1, the same procedure is carried out, which is indicated by 2. Until all cells are grouped, this procedure is repeated. If a cell is grouped from different data simultaneously, this cell is grouped to the data with the worse rank.

The number of cells in each direction, Ds, is determined as:

$$D_s = \epsilon \times |N_C| \quad \text{(Eq. 7)}$$

wherein $\epsilon$ and $|N_C|$ are respectively a predefined parameter and the number of data in a cluster.

Generate Offspring

Figure 12:
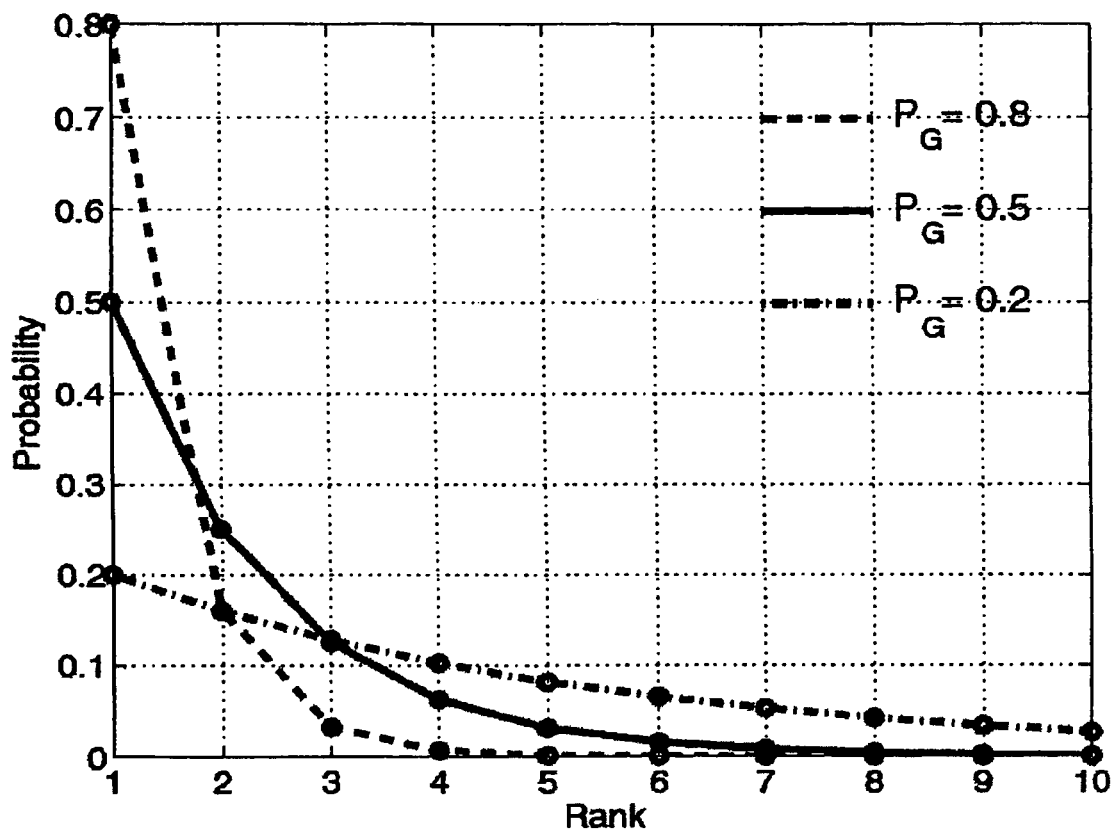
FIG. 12 shows a geometry distribution with PG=0.2, 0.5, 0.8.

In the above section describing the Voronoi-based Stochastic Model, all cells in the generative area were assigned a rank. With the assigned rank, the selection probability is calculated. To calculate the selection probability, the geometry distribution is used. Mathematically, the geometry distribution is calculated as follows:

$$P = P_G(1-P_G)^{r-1} \quad \text{(Eq. 8)}$$

wherein PG and r are the given value in the range [0.0, 1.0] and the rank, respectively. For PG=0.2, 0.5, 0.8, the geometry distributions are drawn in FIG. 12. In this work, PG=0.8 is used.

To generate offspring, a cell is selected according to the above selection probability first. In the selected cell, an offspring is uniformly generated. This flow will be repeated until all necessary offspring are generated.

Comparison of VEDA with NSGA-II

The proposed method of the present invention is tested on the test functions SCH1 (n=2, 5), FON2 (n=2, 5) and OKA4 (n=2). The used parameters are shown in Table 2-a, wherein $\epsilon$ corresponds to the accuracy of a model.

TABLE 2-a

Parameters for VEDA.

| | |
|---|---|
| Number of Data | 100 |
| Number of Offspring | 100 |
| $\epsilon$ | 1.0 for n = 2 |
| | 0.5 for n = 5 |
| Maximum Iterations | 10 |

Since one of the merits of VEDA is less fitness evaluations, only 1000 fitness evaluations are allowed. To reduce computational cost in n=5, the accuracy is reduced from $\epsilon$=1.0 to 0.5.

To compare the results, NSGA-II (non-dominated Sorting Genetic Algorithm II), see Deb, K., Pratap, A., Agarwal, S. and Meyarivan, T. A Fast and Elitist Multiobjective Genetic Algorithm: NSGA-II. IEEE Transactions on Evolutionary Computation, 6(2):182-197, 2002, is also tested with only 1000 fitness evaluations. The parameters for NSGA-II are shown in Table 2-b.

TABLE 2-b

Parameters for NSGA-II.

| | |
|---|---|
| Number of Individuals | 100 |
| Crossover | One-Point Crossover |
| Crossover Rate | 0.9 |
| Mutation Rate | 0.01 |
| Number of Bits per a design parameter | 20 |
| Maximum Iterations | 10 |

Figure 13:
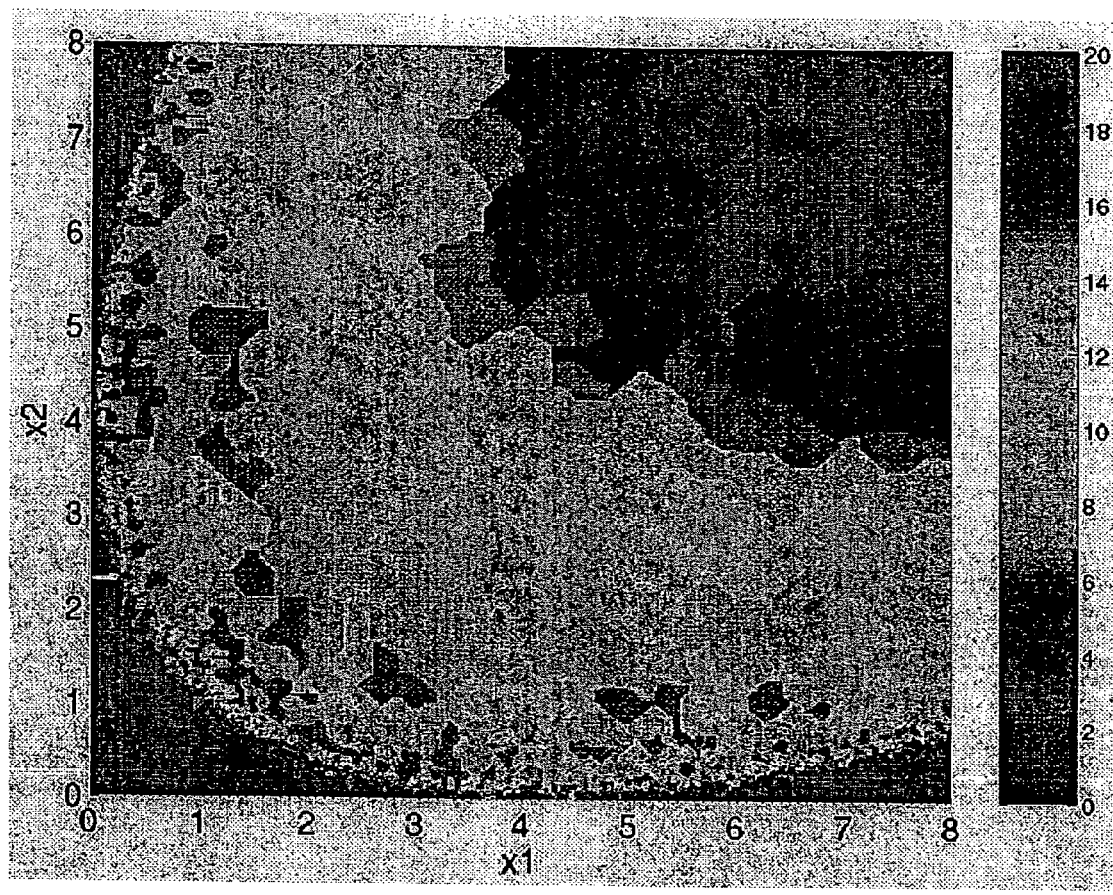
FIG. 13 shows the generated stochastic model for OKA4 in the parameter space, the Pareto front being equal to $x_2 = x_1 \pm 4 \sqrt{x_1} + 4$.

FIG. 13 shows the generated stochastic model for OKA4 in the parameter space, the Pareto front being equal to $x_2 = x_1 \pm 4 \sqrt{x_1} + 4$. The gray-level corresponds to the rank. Clearly, the generated model has a high probability near the Pareto front in the PS.

The simulation results of SCH1, FON2 and OKA4 for VEDA and NSGA-II are shown in FIG. 14. Since OKA4 is designed with a non-linear Pareto front in the PS, the solutions in the PS on OKA4 by VEDA and NSGA-II are shown in FIG. 15. In the figures, all parents are plotted. Since many parents in NSGA-II don't converge to the shown area, the number of individuals seems to be less than VEDA.

On the SCH1 and FON2 with 2 dimensional cases, the differences are small. However, VEDA is better than NSGA-II. On the SCH1 and FON2 with 5 dimensional cases, the performance of both is not sufficient. However, clearly VEDA shows a better result than NSGA-II. On the OKA4, the difference is clear. VEDA nearly converges to the Pareto front but NSGA-II does not.

From these results, VEDA shows better performance than NSGA-II in the early generation. This indicates that a real-world optimization problem may be solved without many fitness evaluation by the proposed VEDA. However, VEDA has also drawbacks, e.g. the increase of the computational complexity in higher dimensional cases. Like other EDAs, the current capacity of VEDA is about 10 dimension. Since many real-world optimization problems have a large number of design parameters, the current capacity of EDAs is not sufficient.

Comparison of VEDA with Other EDAs for MOO

Although EDAs are mainly studied on single objective optimization (SOO) problems, recently some methods have applied EDAs to MOO. Thierens and Bosman have applied Mixture-based Iterated Density Estimation Evolutionary Algorithm (MIDEA) to MOO and Costa and Minisci have applied Parzen-based EDA (PEDA) to MOO. Since both of them have used the same test functions, we use these test functions for the comparison. Since MIDEA did not show a sufficient quality on test function ZDT4 (n=10), ZDT4 is not used in this comparison. The maximum number of iterations is set as Table 3. The numbers of data and offspring are 100 and the value of $\epsilon$ is 1.0 for test functions FON2 and KUR1 and 0.1 for test function DEB4. See Thierens, D. and Bosmann, P. A. N. Multi-Objective Mixture-based Iterated Density Estimation Evolutionary Algorithms. In Proceedings of Genetic and Evolutionary Computation Conference (GECCO-2001), pages 663-670, 2001 for MIDEA, which is incorporated by reference herein in its entirety and Costa et al. for PEDA.

TABLE 3

Maximum number of iterations.

| Method | FON2 (n = 3) | KUR1 (n = 3) | DEB4 (n = 10) |
|---|---|---|---|
| MIDEA | 3754 | 10762 | 8426 |
| PEDA | 3100 | 11000 | 8300 |
| VEDA | 3100 | 10700 | 8300 |

Figure 16:
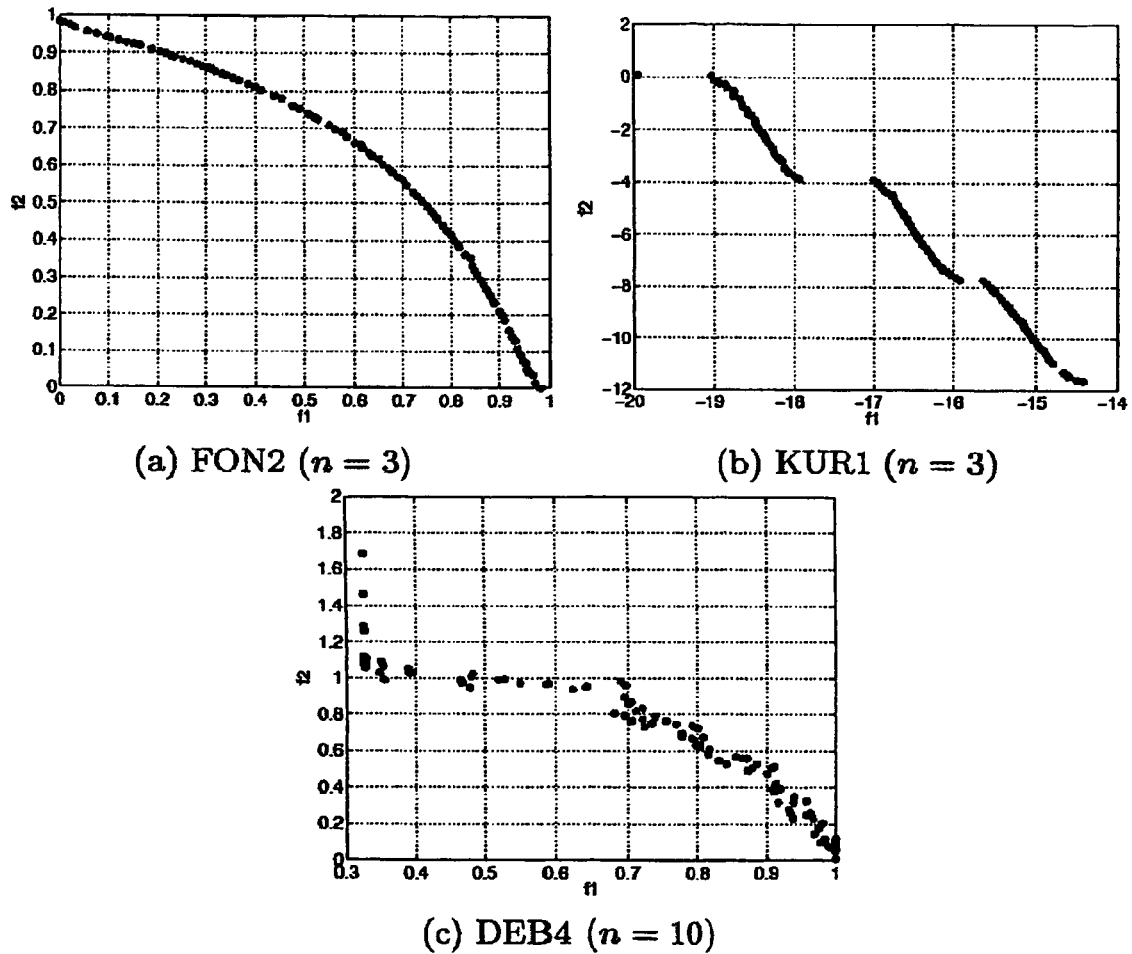
FIG. 16 shows a comparison of VEDA concept according to the present invention with the conventional systems.

The results and a comparison of VEDA with state of the art methods are shown in FIG. 16. By comparison with the results from Table 3, VEDA is superior to MIDEA and PEDA on FON2 and KUR1 but VEDA is inferior to them on DEB4. Taking a closer look, the reason for DEB4 is caused by the generation of many offspring in an infeasible region. Since the current VEDA has no restriction for perturbation, the design parameters can easily become less than zero, thus in the case of design infeasible. By adding additional constraints in VEDA, the performance may be improved.

Piece-wise Linear Approximation of Pareto Front with VEDA

In the state of the art, nearly all MOO methods output a set of solutions to represent the Pareto front. There is no MOO method to output a mathematical description of the Pareto front in the parameter space. Jin and Sendhoff have proposed a way to represent the Pareto front by piece-wise linear functions in the PS. Since many test functions have a linear Pareto front in the PS, they have exploited this characteristic to get more accurate solutions. See Jin, Y. and Sendhoff, B. Connectedness, Regularity and the Success of Local Search in Evolutionary Multi-Objective Optimization. In Proceedings of Congress on Evolutionary Computation (CEC-2003), volume 3, pages 1910-1917, 2003 which is incorporated by reference herein in its entirety.

One of the implicit characteristics of VEDA is the availability of a mathematical description instead of just a solution set. Since VEDA uses the PCA and the maximum and minimum values in each axis, VEDA can output mathematical description. As an example, the output of VEDA on SCH1 (n=2) is shown in Table 4.

TABLE 4

Mathematical output of VEDA.

| | |
|---|---|
| Principal Axis | {0.701764, 0.712410} |
| Orthogonal Axis | {0.712410, −0.701764} |
| Minimum Value in Principal Axis | −0.042017 |
| Maximum Value in Principal Axis | 2.841821 |
| Minimum Value in Orthogonal Axis | −0.166802 |
| Maximum Value in Orthogonal Axis | 0.208333 |

Figure 17:
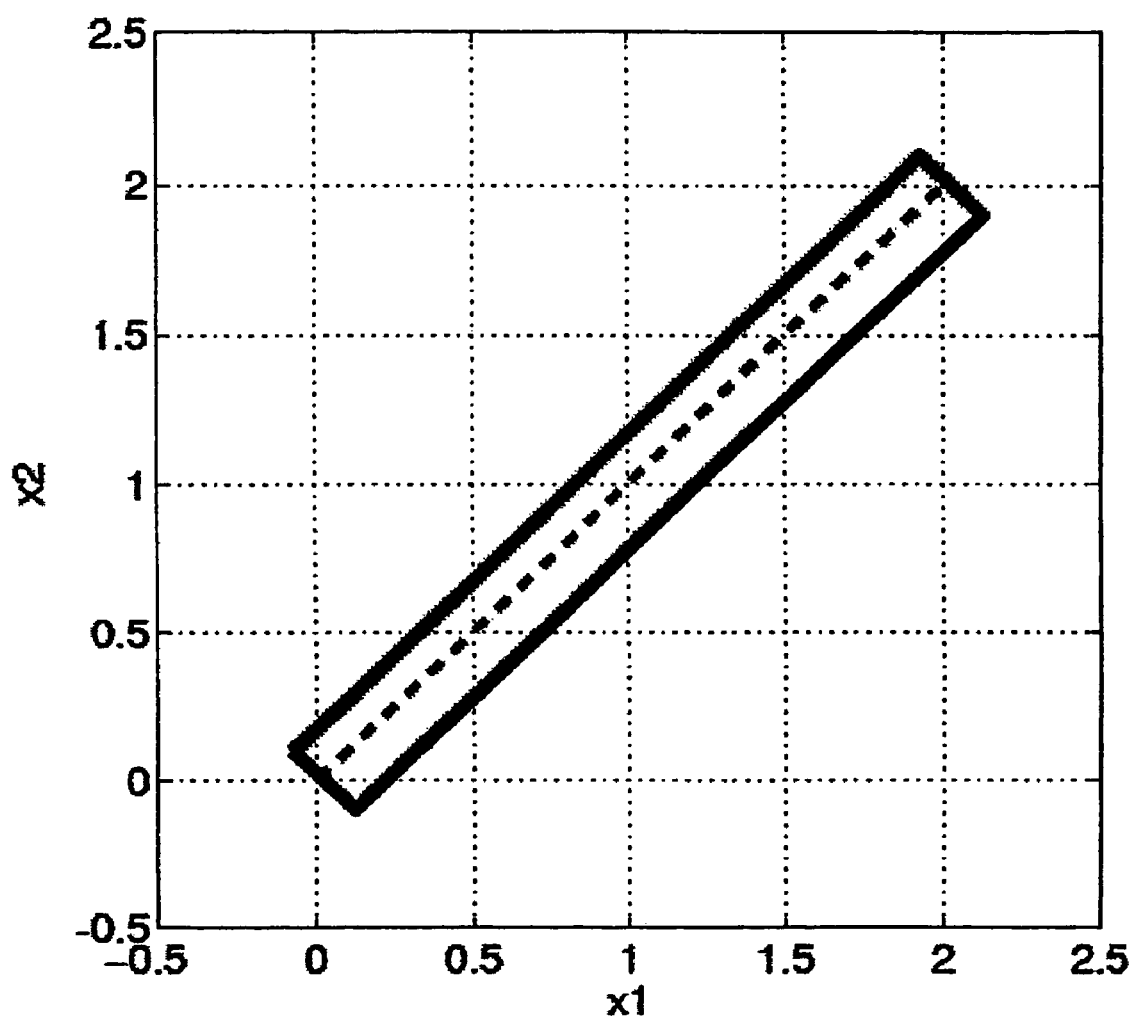
FIG. 17 shows a graphical output of VEDA, wherein the solid rectangle is the output of VEDA, and the dotted line is the true Pareto front in the PS.

The graphical output is shown in FIG. 17. In FIG. 17, the solid rectangle is the output of VEDA and the dotted line is the Pareto front in the PS. The principal axis shows the gradient of the solution set and the minimum and maximum values indicate the range. By the information of axis and its range, the mathematical output seems to be possible.

Summary of the Advantages of the Present Invention

The invention proposes the Voronoi-based Estimation of Distribution Algorithm (VEDA) for tackling MOO problems. In VEDA, the offspring distribution with the ranking information is directly used to generate promising solutions. Using the concept of Voronoi mesh, the stochastic model is made and the promising solutions are generated according to the generated stochastic model.

On several test functions, the performance of VEDA has been compared with a state-of-the-art MOO algorithm called NSGA-II proposed in Deb, K., Pratap, A., Agarwal, S. and Meyarivan, T. A Fast and Elitist Multiobjective Genetic Algorithm: NSGA-II. IEEE Transactions on Evolutionary Computation, 6(2):182-197, 2002 which is incorporated by reference herein in its entirety. The performance of VEDA is better than NSGA-II. With a small number of fitness evaluations, VEDA can identify the Pareto front in most cases. This indicates the possibility to reduce the computational cost in real-world problems using VEDA. Although VEDA shows good performance on several test functions, the remaining problem is the increase of the computational complexity in higher dimensional cases. Additionally, VEDA should be modified to consider additional constraints.

In the VEDA, several parameters are introduced. Since the performance of the VEDA seems to be stable against the parameters, the fixed values are used in this invention. However, the parameter dependency should be taken into account. Although most of MOO methods in the state of the art output only solution set, VEDA can output a mathematical description.

What is claimed is:

1. A method for optimizing a design representing a physical object, wherein said physical object is an aerodynamic or hydrodynamic structure, comprising the steps of:
   (a) providing an initial population or a data set with a plurality of members respectively represented by parameter sets representing the design;
   (b) applying one or a plurality of fitness functions to evaluate the quality of the members of the population;
   (c) generating offspring of the population by means of a stochastic model using information from all members of the population;
   (d) applying one or a plurality of fitness functions to evaluate the quality of the offspring with respect to the underlying problem of the optimization;
   (e) selecting offspring,
   (f) repeating steps (c) through (e) until the quality reaches a threshold value representing the optimized design, and
   (g) storing said optimized design in a computer storage capable of being executed by a computing device;
   wherein a Voronoi-mesh is applied in step (c) to build a stochastic model for generating offspring.

2. The method of claim 1, wherein in step (d) the members are ranked according to their quality, and wherein in step (e) all members are stored and members of a higher respectively lower rank have a higher respectively lower selection probability.

3. The method of claim 1, wherein each cell in the Voronoi-mesh is assigned a selection probability based on a rank of the cell.

4. The method of claim 1, wherein the stochastic model is perturbed to avoid local optima.

5. The method of claim 1, wherein the data in the space of the parameter sets are clustered in generating stochastic model in step (c).

6. The method of claim 1, wherein at least one of the principal component analysis and the independent component analysis are used in generating a stochastic model in step (c).

7. The method of claim 1, wherein at least one of a function approximation of the solution space and the fitness space is generated.

8. A computer software program product, implementing a method of claim 1 when executing when running on a computing device.

9. A system for optimizing a design representing a physical object, wherein said physical object is an aerodynamic or hydrodynamic structure, comprising:

means for providing an initial population or a data set with a plurality of members respectively represented by parameter sets;

means for applying one or a plurality of fitness functions to evaluate the quality of the members of the population;

means for generating offspring of the population by means of a stochastic model using information from all members of the population;

means for applying one or a plurality of fitness functions to evaluate the quality of the offspring with respect to the underlying problem of the optimization;

means for selecting offspring;

means for comparing the quality to a threshold value; and means for storing said optimized design in a computer storage capable of being executed by a computing device;

wherein a Voronoi-mesh is applied in the means for generating offspring to build a stochastic model for generating offspring.

* * * * *